United States Patent
Rasmussen et al.

(10) Patent No.: US 7,239,959 B2
(45) Date of Patent: Jul. 3, 2007

(54) METHOD AND APPARATUS FOR CUSTOMIZING TRAVEL DIRECTIONS

(75) Inventors: Jens Eilstrup Rasmussen, Berkeley, CA (US); Lars Eilstrup Rasmussen, Berkeley, CA (US)

(73) Assignee: Google, Inc., Mountain View, CA (US)

(*) Notice: Subject to any disclaimer, the term of this patent is extended or adjusted under 35 U.S.C. 154(b) by 0 days.

(21) Appl. No.: 11/009,163

(22) Filed: Dec. 8, 2004

(65) Prior Publication Data
US 2006/0064241 A1  Mar. 23, 2006

Related U.S. Application Data

(60) Provisional application No. 60/528,109, filed on Dec. 8, 2003.

(51) Int. Cl.
*G01C 21/00* (2006.01)
(52) U.S. Cl. .................. 701/200; 701/201; 701/209; 701/212; 342/357.13
(58) Field of Classification Search ............. 701/200, 701/201, 202, 206, 207, 208, 209, 212, 23; 342/357.01, 357.13, 357.1
See application file for complete search history.

(56) References Cited

U.S. PATENT DOCUMENTS

| | | | |
|---|---|---|---|
| 6,405,123 B1 * | 6/2002 | Rennard et al. ............ 701/200 |
| 6,724,382 B2 | 4/2004 | Kenyon et al. | |
| 2002/0067353 A1 | 6/2002 | Kenyon et al. | |
| 2002/0067374 A1 | 6/2002 | Kenyon | |
| 2002/0067379 A1 | 6/2002 | Kenyon et al. | |
| 2004/0039520 A1 * | 2/2004 | Khavakh et al. ............. 701/201 |
| 2004/0243307 A1 * | 12/2004 | Geelen ....................... 701/213 |

OTHER PUBLICATIONS

MapQuest.Com Maps, Directions and More, [online], [retrieved on Aug. 1, 2005]. Retrieved from the Internet <URL: http://www.mapquest.com>.
Yahoo! Maps, Driving Directions, and Traffic, [online], [retrieved on Aug. 1, 2005]. Retrieved from the Internet <URL: http://maps.yahoo.com>.
MultiMap.com—Online Maps Everywhere, [online], [retrieved on Aug. 1, 2005]. Retrieved from the Internet <URL: http://multimaps.com>.

(Continued)

*Primary Examiner*—Gertrude A. Jeanglaude
(74) *Attorney, Agent, or Firm*—Fenwick & West LLP

(57) ABSTRACT

Various methods, systems, and apparatuses for customizing travel actions in travel directions are disclosed. One method and apparatus includes providing a first set of travel directions to a user, the travel directions including at least one travel action, receiving at least one selected travel action and a replacement travel action from the user associated with the first set of travel directions, and outputting a second set of travel directions associated with the at least one selected travel action and the replacement travel action. Another method and apparatus includes obtaining travel directions based on a start point and an end point, comparing travel actions from the travel directions with a customization file, the customization file including at least one selected travel action and a replacement travel action, determining that at least one travel action in the travel directions is the same as the at least one selected travel action, and integrating the replacement travel action into the travel directions.

37 Claims, 23 Drawing Sheets

OTHER PUBLICATIONS whereis.com—Search Australian Maps, [online], [retrieved on Aug. 1, 2005]. Retrieved from the Internet <URL: http://www.whereis.com/whereis/home.jsp>.

TerraServer-USA, [online], [retrieved on Aug. 1, 2005]. Retrieved from the Internet <URL:http://terraserver.homeadvisor.msn.com/>.

NASA World Wind, [online], [retrieved on Aug. 1, 2005]. Retrieved from the Internet <URL:http://worldwind.arc.nasa.gov/>, pp. 1-2.

MSN Maps & Directions, [online], [retrieved on Aug. 1, 2005]. Retrieved from the Internet <URL:<http://maps.msn.com/(ogxuearj4ya5au55fogcdzbt)/Home.aspx>.

Dragan, Richard V., MSN Virtual Earth 1.0, MSN Virtual Earth 1.0 review by PC Magazine, Jul. 26, 2005, [online], [retrieved on Aug. 1, 2005]. Retrieved from the Internet <URL:http://www.pcmag.com/article2/0,1895,1840750,00.asp>, pp. 1-2.

Montalbano, Elizabeth, Microsoft Takes on Google with Virtual Earth, IDG News Service, Jul. 25, 2005, [online], [retrieved on Aug. 1, 2005]. Retrieved from the Internet <URL:http://www.infoworld.com/article/05/07/25/HNmsvirtualearth_1.html>.

MSN Virtual Earth To Take On Google Earth, [online], [retrieved on Aug. 1, 2005]. Retrieved from the Internet <URL: http://blog.searchenginewatch.com/blog/050523-125208>, pp. 1-4.

Crawford, Clayton, et al., Fast 3D Visualization of Large Image Datasets in a GIS, Earth Observation Magazine, vol. 12, No. 9, Dec. 2003, USA, pp. 1-5.

MSN Virtual Earth—Microsoft Internet Explorer, [online], [retrieved on Aug. 1, 2005]. Retrieved from the Internet URL:http://virtualearth.msn.com, pp. 1-3.

* cited by examiner

1525

Directions from 448 Bristol Dr., Emery, CA to 670 Lily Way, Cambria, CA:

| | |
|---|---|
| Drive east on Bristol Dr | (0.3 miles) |
| Turn left onto Wyview Rd | (0.5 miles) |
| Turn right onto Blackwood Dr | (1.2 miles) |
| Turn right onto Marshall Rd | (0.3 miles) |
| Turn left onto College Rd | (0.4 miles) |
| Turn right onto Durrant St | (0.6 miles) |
| Turn left onto Crown Valley BLVD | (3.0 miles) |
| Merge onto I-45 North | (34.5 miles) |
| Merge onto HWY 1 South | (3.4 miles) |
| Turn left onto Ocean BLVD | (1.1 miles) |
| Turn right onto Moonstone Dr | (0.6 miles) |
| Turn left onto Lily Way | (0.5 miles) |

1530

1535

| | |
|---|---|
| Turn right onto Blackwood Dr | (1.2 miles) |
| Turn right onto Marshall Rd | (0.3 miles) |
| Turn left onto College Rd | (0.4 miles) |

1540

1545

| | |
|---|---|
| Turn right onto Marshall Rd | (0.3 miles) |
| Turn left onto College Rd | (0.4 miles) |
| Turn right onto Durrant St | (0.6 miles) |
| Turn left onto Crown Valley BLVD | (3.0 miles) |

METHOD AND APPARATUS FOR CUSTOMIZING TRAVEL DIRECTIONS

CROSS-REFERENCE TO RELATED APPLICATIONS

This application claims priority to U.S. Provisional Patent Application No. 60/528,109, filed Dec. 8, 2003, which is incorporated herein by reference.

BACKGROUND

1. Field of the Invention

Implementations consistent with the principles of the invention relate generally to automated travel planning systems, and more specifically, to automated travel planning systems in a digital environment.

2. Description of Related Art

Computerized mapping systems have been developed for facilitating travel planning. For example, travel-planning Internet websites are commercially available and well-known. Such websites typically permit a user to input a starting point and an end point for travel, and these are then used to calculate and provide travel directions to the user. Because the travel directions are not customized to take account of the user's experience and knowledge of the relevant area, travel directions generated by such websites typically contain steps or instructions that a user might find unnecessary and/or wasteful.

For example, as shown in FIGS. 1–3, travel directions generated by known systems may contain unwanted or unnecessary steps. FIG. 1 illustrates a web browser 100 that displays a travel direction data entry web page 105. As shown, a user has entered a start point of 95 Riley Dr., Bison, N.Y. and an end point of 774 Albany Ave, Nantucket, N.Y. The user then requests the directions by selecting a "Get Directions" button 110. Directions are then calculated and displayed on the browser 100 in a travel directions web page 200, as illustrated in FIGS. 2–3. As shown, the displayed directions are longer (i.e., require more space for display) than the size of the browser 100 display. Therefore a scroll bar 205 is typically provided so that the user may scroll down to see the remainder of the travel directions. FIG. 3 depicts the remainder of the travel directions after the user has used the scroll bar 205 to scroll down to the bottom of the travel directions web page 200.

As illustrated by the preceding example, the travel directions generated by known systems may include a number of steps that the user already knows, such as how to go from home (95 Riley Dr.) to the highway (HWY 28), As shown in FIG. 2, this portion of the travel directions requires nine separate instructions. These unnecessary instructions add clutter to the travel directions the user actually needs. Indeed, the user may even disagree with the travel route that has been automatically generated by the system for this portion of the trip. Further, the user may be required to scroll down to view the remainder of the directions, instead of having all of the needed directions provided in the same display. Moreover, the extraneous steps may cause unnecessary paper to be used if the user prints out the directions. It is desirable to address the limitations in the art.

BRIEF SUMMARY

Various methods, systems, and apparatuses for customizing travel actions in travel directions are disclosed. One method includes providing a first set of travel directions to a user, the travel directions including at least one travel action, receiving at least one selected travel action and a replacement travel action from the user associated with the first set of travel directions, and outputting a second set of travel directions associated with the at least one selected travel action and the replacement travel action.

Another method includes obtaining travel directions based on a start point and an end point, comparing travel actions from the travel directions with a customization file, the customization file including at least one selected travel action and a replacement travel action, determining that at least one travel action in the travel directions are the same as the at least one selected travel action, and integrating the replacement travel action into the travel directions.

BRIEF DESCRIPTION OF THE DRAWINGS

The accompanying drawings, which are incorporated in and constitute a part of this specification, illustrate various embodiments. In the drawings.

FIG. 15B provides exemplary data for use with the flow chart diagram of FIG. 15A;

DETAILED DESCRIPTION

Various aspects of the disclosure are described herein in the context of an apparatus, system, and method for customizing travel directions. Those of ordinary skill in the art will realize that the following description is illustrative only and not in any way limiting. Other aspects will readily suggest themselves to such skilled persons having the benefit of this disclosure. For example, any number of computer programming languages, such as the Java language, C, C++, Perl, Pascal, Smalltalk, FORTRAN, assembly language, HTML, etc., may be used. Further, various programming approaches such as procedural, object-oriented or artificial intelligence techniques may be employed, depending on the requirements of each particular implementation.

The same reference numbers will be used throughout the drawings and the following description to refer to the same or like parts. Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

Figure 4:
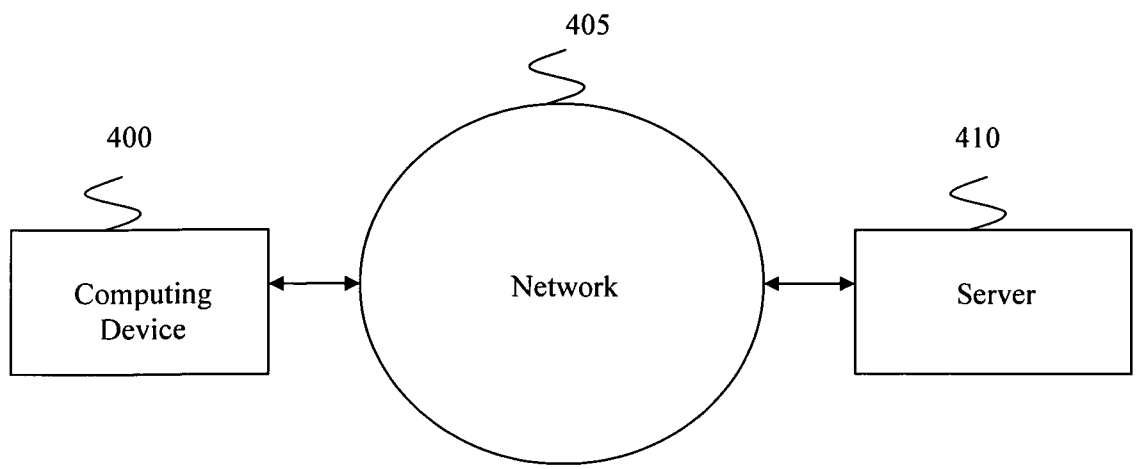
FIG. 4 illustrates a distributed network according to one embodiment.

FIG. 4 illustrates a distributed network according to one embodiment. A computing device 400 is shown connected to a network 405. A server 410 is also connected to the network 405. The computing device 400 may be any type of device configured for computing, such as a personal computer, a mobile phone, a personal digital assistant, a navigation system located in a vehicle, and so on. The server 410 may be any device capable of hosting services over the network 405, such as a network server or a web server. The server 410 may also be capable of determining and/or obtaining travel directions based on user input, such as, e.g., a server for Mapquest's mapping service, Yahoo Maps mapping service, or any other appropriate server using commercially available mapping hardware and/or software. Alternatively, the computing device 400 may be equipped with the capability to determine and/or obtain travel directions.

The network 405 may be any type of distributed network, such as a local area network, wide area network, Intranet, Internet or World Wide Web network. Alternatively, the network 405 may be a direct connection between the computing device 400 and the server 410. The computing device 400, network 405 and/or server 410 may be in communication via any type of wired or wireless connection. Moreover, the computing device 400, the server 410, other computing devices (not shown), and/or other servers (not shown) in communication with the network 405 may be used to perform any or all functions described herein.

Figure 5:
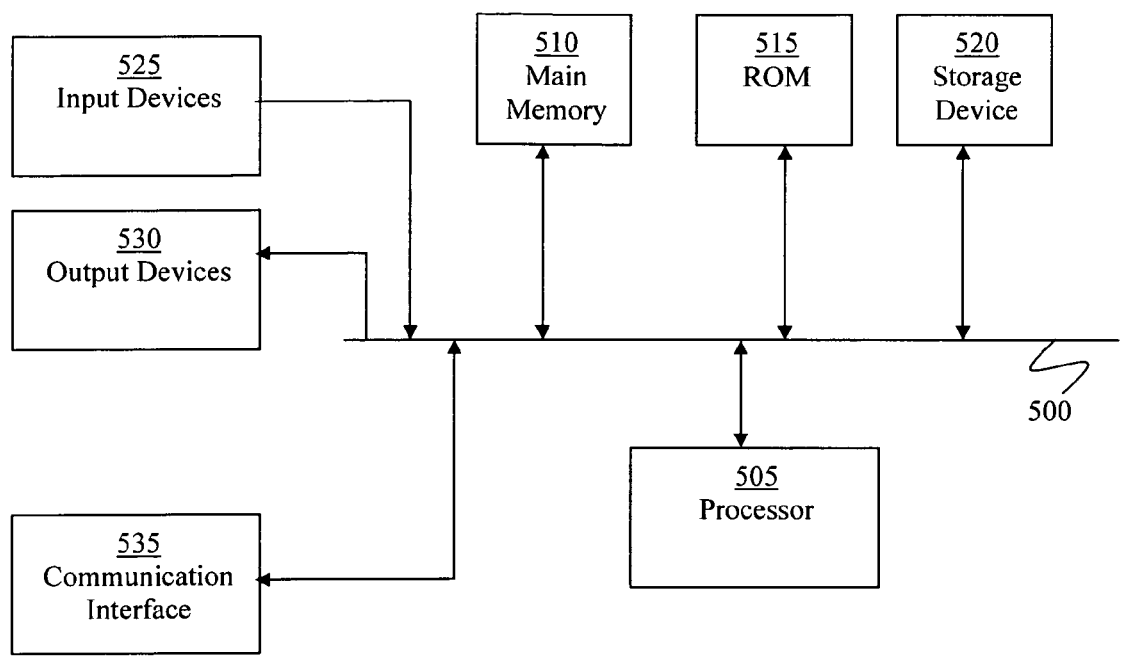
FIG. 5 is an exemplary diagram of a computing device or server.

FIG. 5 is an exemplary diagram of a computing device 400 or server 410. Computing device/server 400/410 may include a bus 500, a processor 505, a main memory 510, a read-only memory (ROM) 515, a storage device 520, one or more input devices 525, one or more output devices 530, and a communication interface 535. Bus 500 may include one or more conductors that permit communication among the components of computing device/server 400/410.

Processor 505 may include any type of conventional processor, microprocessor, or processing logic that interprets and executes instructions. Main memory 510 may include a random-access memory (RAM) or another type of dynamic storage device that stores information and instructions for execution by processor 505. ROM 515 may include a conventional ROM device or another type of static storage device that stores static information and instructions for use by processor 505. Storage device 520 may include a magnetic and/or optical recording medium and its corresponding drive.

Input device(s) 525 may include one or more conventional mechanisms that permit a user to input information to computing device/server 400/410, such as a keyboard, a mouse, a pen, a stylus, handwriting recognition, voice recognition and/or biometric mechanisms, etc. Output device(s) 530 may include one or more conventional mechanisms that output information to the user, including a display, a printer, a speaker, etc. Communication interface 535 may include any transceiver-like mechanism that enables computing device/server 400/410 to communicate with other devices and/or systems. For example, communication interface 535 may include mechanisms for communicating with another device or system via a network, such as network 405.

As will be described in detail below, computing device 400 and/or server 410, may perform operations based on software instructions that may be read into memory 510 from another computer-readable medium, such as data storage device 520, or from another device via communication interface 535. The software instructions contained in memory 510 cause processor 505 to perform processes that will be described later. Alternatively, hardwired circuitry may be used in place of or in combination with software instructions to implement processes consistent with the present invention. Thus, various implementations are not limited to any specific combination of hardware circuitry and software.

Figure 6:
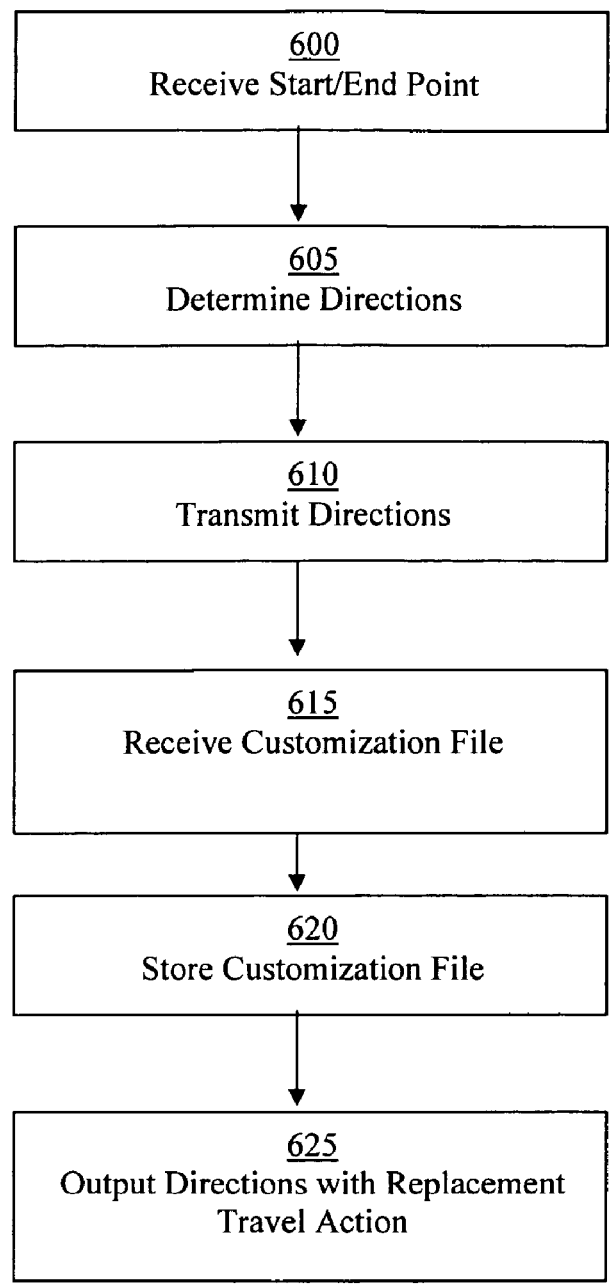
FIG. 6 illustrates a flow chart diagram showing how a server may be used to customize travel directions according to one embodiment.

FIG. 6 is a flow chart diagram illustrating how a server may be used to customize travel directions according to one embodiment. FIGS. 7–11 illustrate certain aspects of this embodiment.

Figure 1:
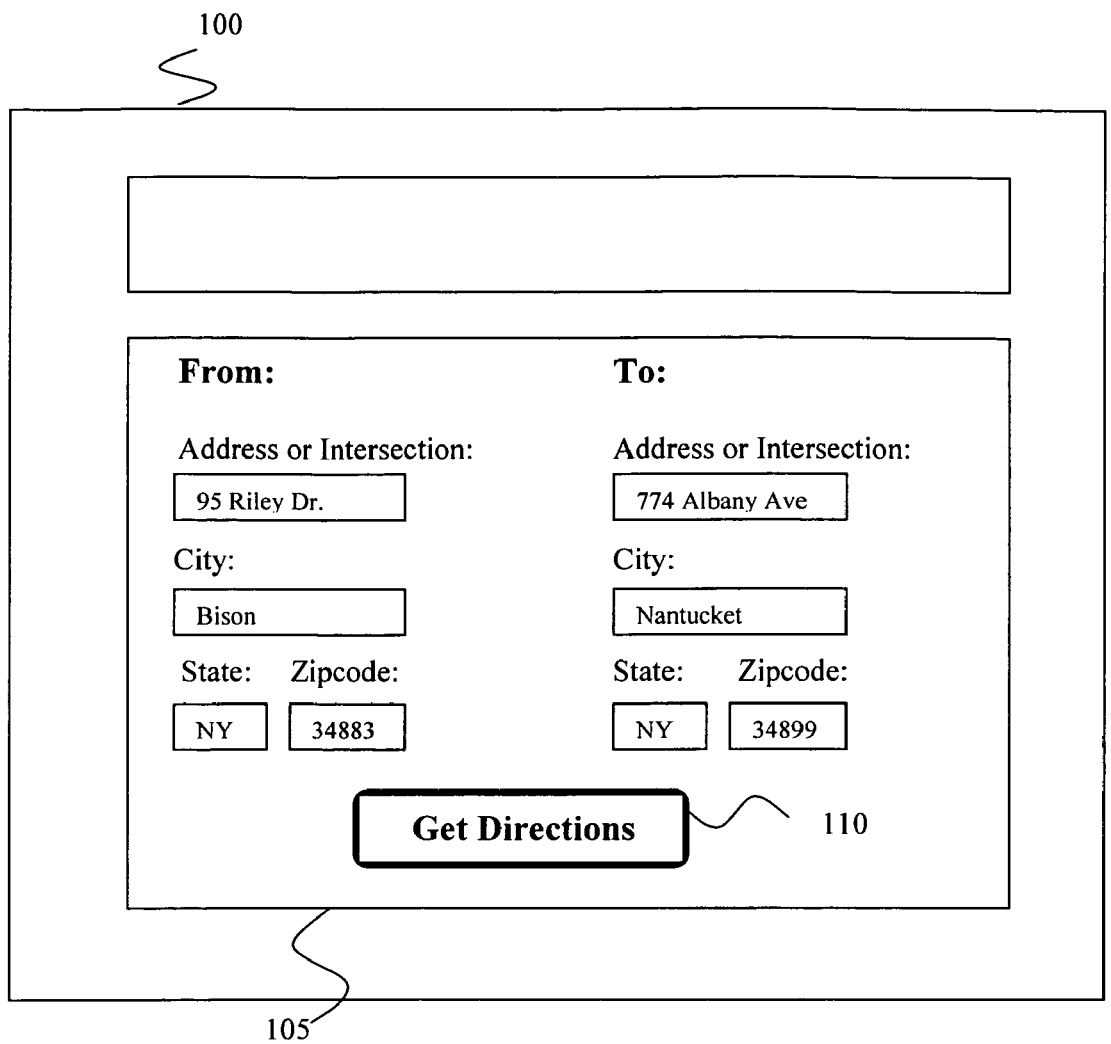
FIG. 1 illustrates a web browser that displays a travel direction data entry web page.
Figure 2:
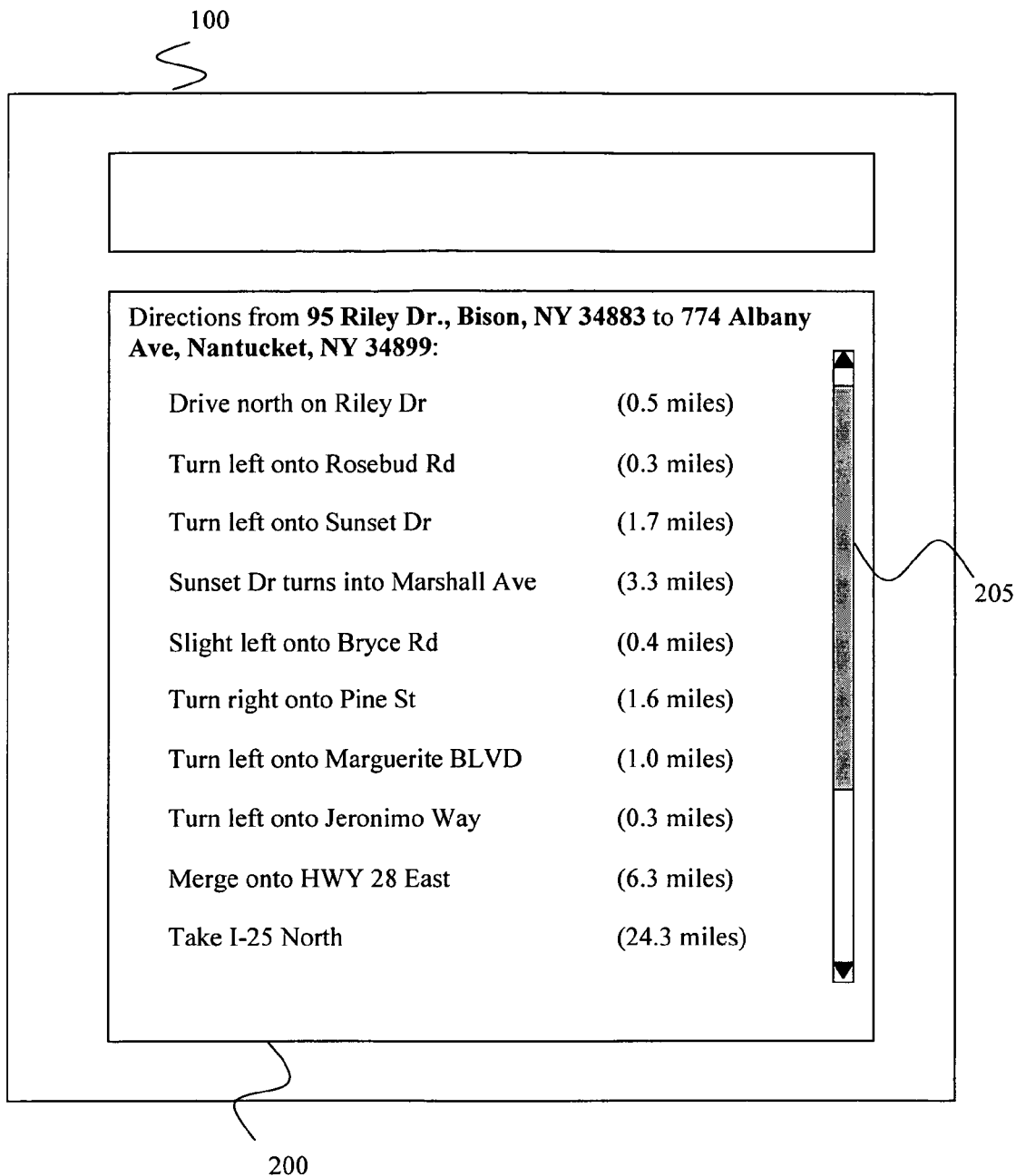
FIGS. 2 and 3 illustrate directions that are calculated and displayed on the web browser in a travel directions web page.
Figure 3:
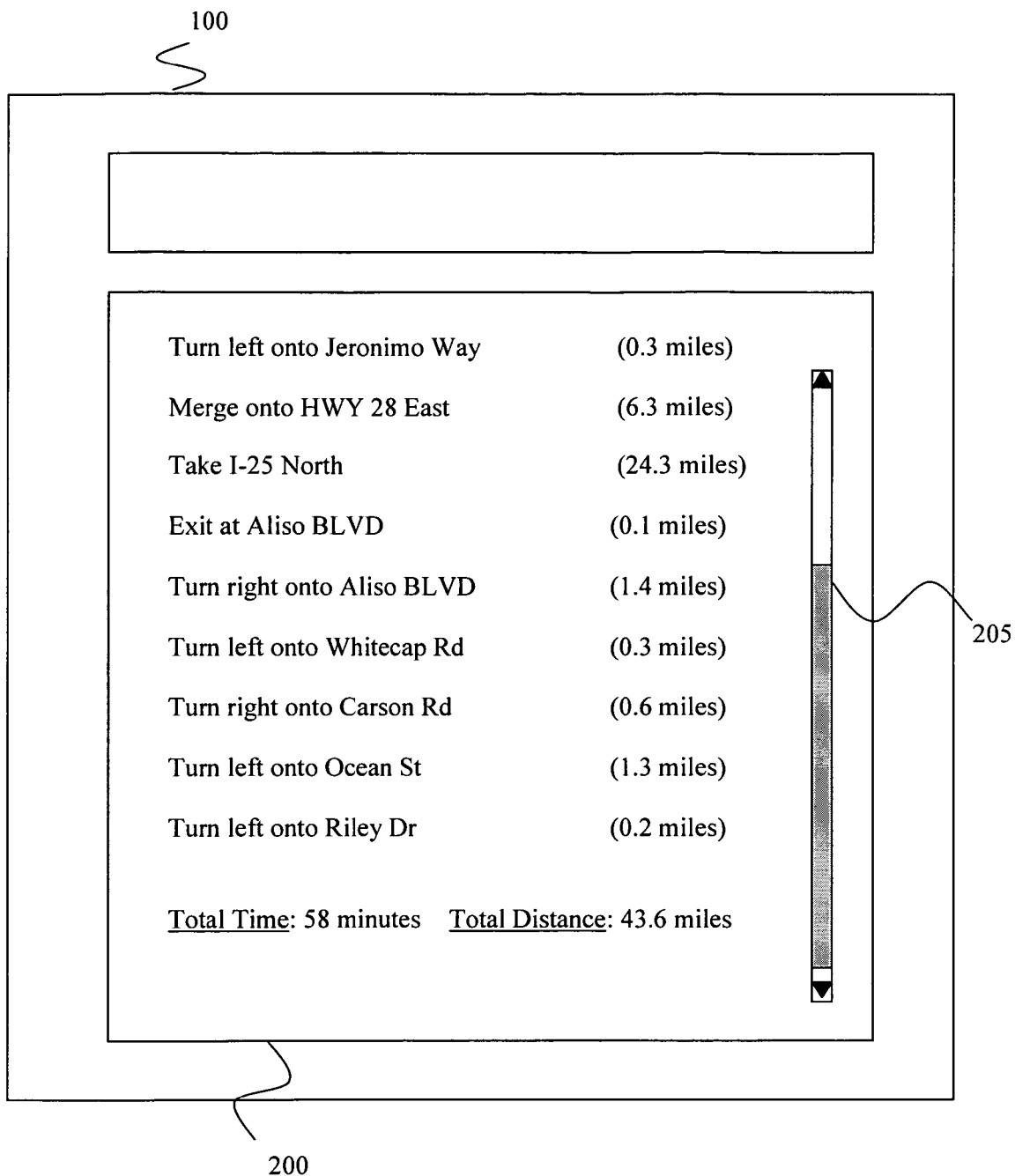

As shown in FIG. 6, a user inputs a start and end point using the computing device 400, which are then transmitted to and received by the server 410 via the network 405 (block 600). For example, the user may have requested travel directions in a manner similar to that described above in the discussion of FIG. 1.

Next, the server 410 determines the requested travel directions based on the entered start and end point (block 605) and transmits them to the computing device 400 via the network 405 (block 610). The computing device 400 outputs the requested directions for the user. Before returning to a discussion of the remaining steps depicted in FIG. 6, a more detailed description of exemplary travel directions that may be output at computing device 400 after execution of block 610 is provided at this point.

Figure 7:
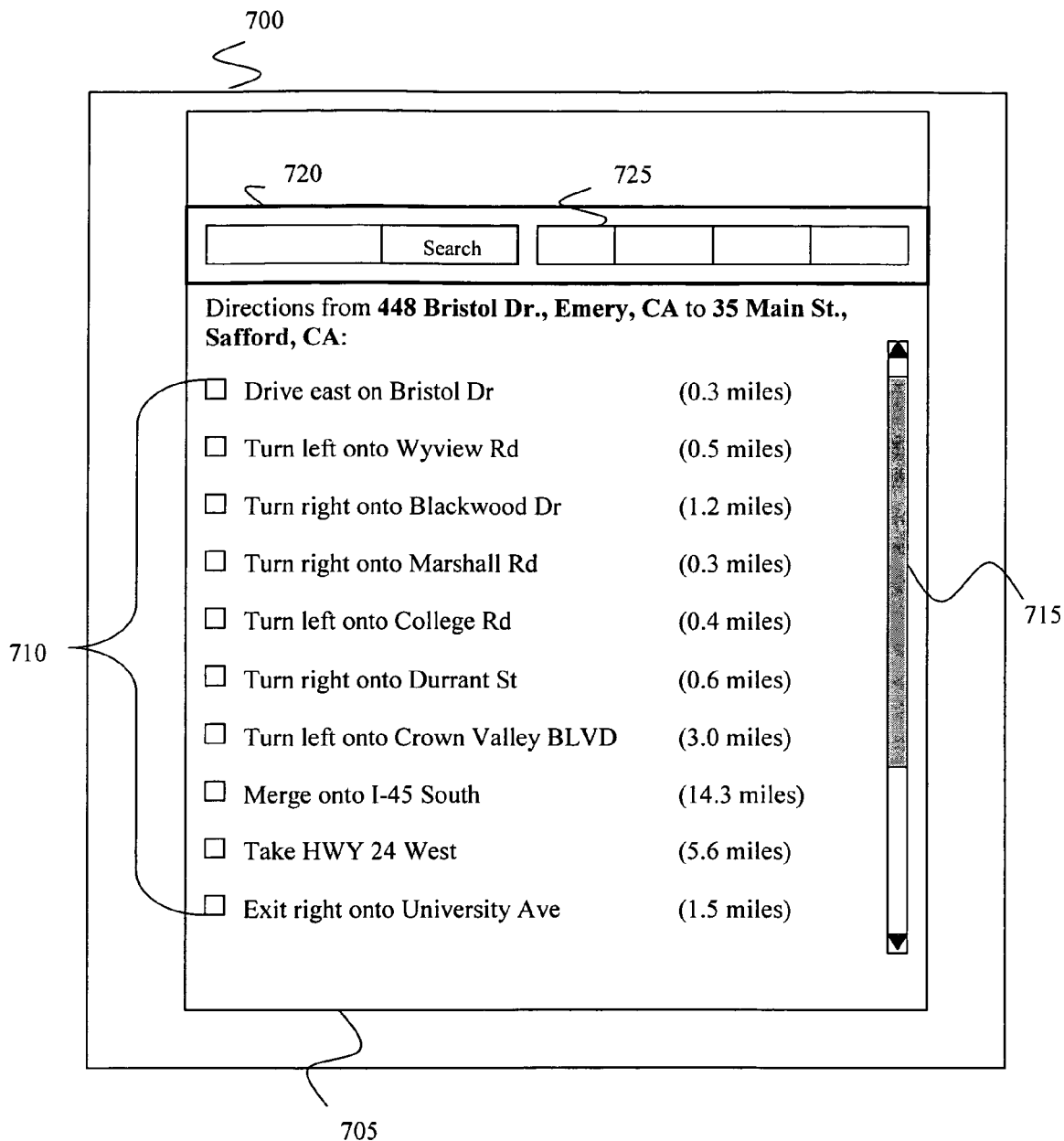
FIGS. 7–11 illustrate an example of certain aspects of this embodiment.

FIG. 7 illustrates an example of travel directions that may be output to the user on the computing device 400. Here, a browser window 700 may be used to display information on the computing device 400. The browser 700 may be any type of visual display capable of displaying data received from the network 405, such as Microsoft's Internet Explorer browser, Netscape's Navigator browser, PalmSource's Web Browser or any other browsing or application software capable of communicating with network 405. The computing device 400 may also include a browser assistant 720. The browser assistant 720 may include a plug-in, an applet, a dynamic link library (DLL), or a similar executable object or process. Further, the browser assistant 720, which is illustrated as a graphical user interface, may be a toolbar, software button, or menu that provides an extension to the browser 700. Alternatively, the browser assistant 720 may be a part of the browser 700, in which case the browser 700 would implement the functionality of the browser assistant 720.

The browser 700 and/or the browser assistant 720 may act as an intermediary between the user and the computing device 400 and/or the network 405. For example, source documents or other information received from devices connected to the network 405 may be output to the user via the browser 700. Also, both the browser 700 and the browser assistant 720 are capable of performing operations on the received source documents prior to outputting the source documents to the user. Further, the browser 700 and/or the browser assistant 720 may receive user input and transmit the inputted data to the server 410 or other devices connected to the network 405.

By way of example, and without limitation, the browser 700 is shown as displaying travel directions 705, which may have been obtained from server 410. Such results, for example, may be provided via a webpage consisting of Hypertext Markup Language (HTML), which the browser 700 is capable of interpreting for output to a user. As shown, the travel directions 705 are from 440 Bristol Drive, Emery, Calif. to 35 Main Street, Safford, Calif. The travel directions 705 include many travel actions from the start point on Bristol Drive to the end point on Main Street. The distance traveled for each travel action is also displayed. Further, selection boxes 710 are provided. Furthermore, a scroll bar 715 is provided so that the user can scroll down to view all of the displayed travel directions.

Figure 8:
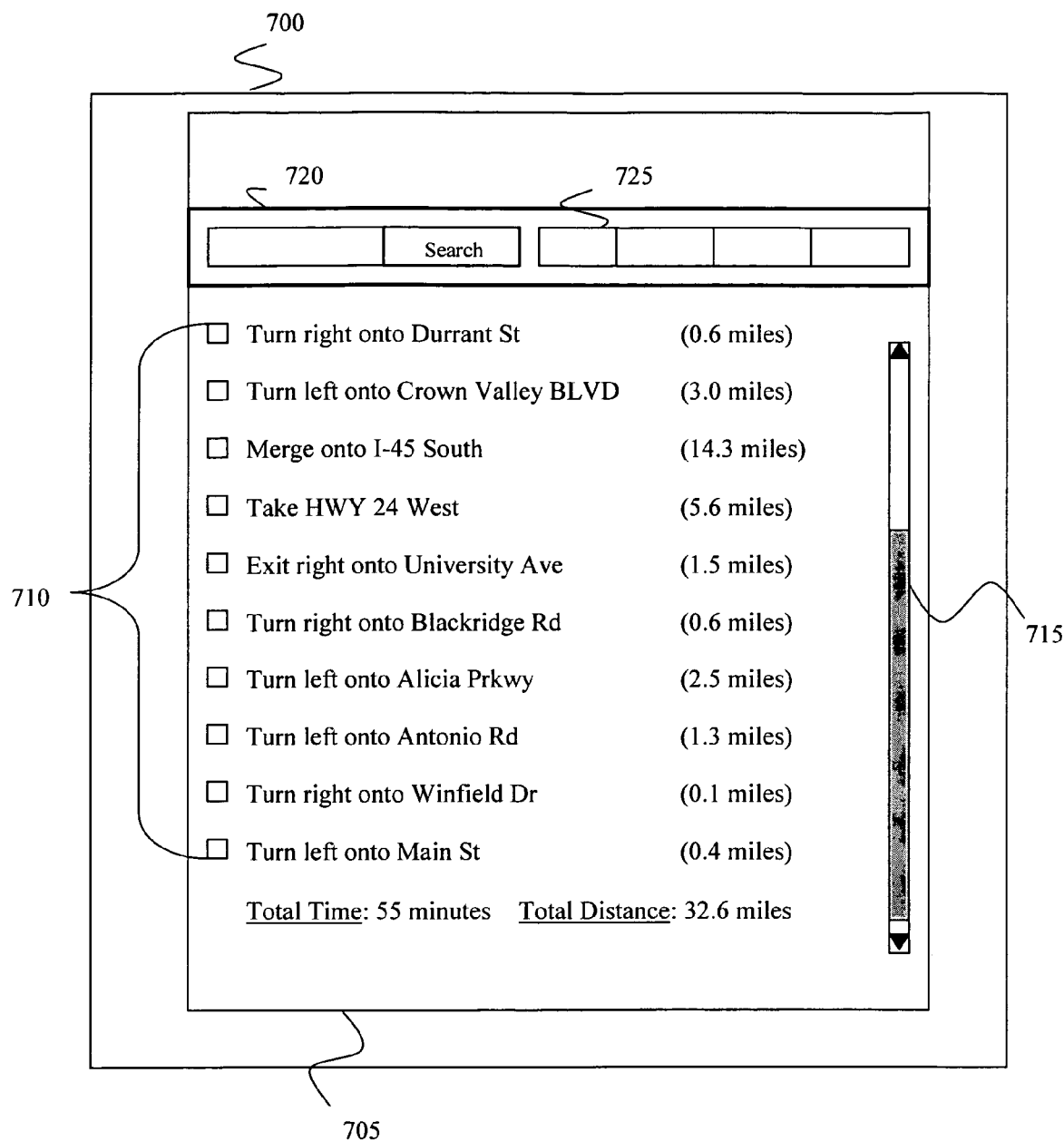

FIG. 8 illustrates the browser 700 after the user has scrolled down using the scroll bar 715 to view the rest of the travel actions 710 provided in travel directions 705. A total time of 55 minutes and a total distance of 32.6 miles are also displayed.

Figure 9:
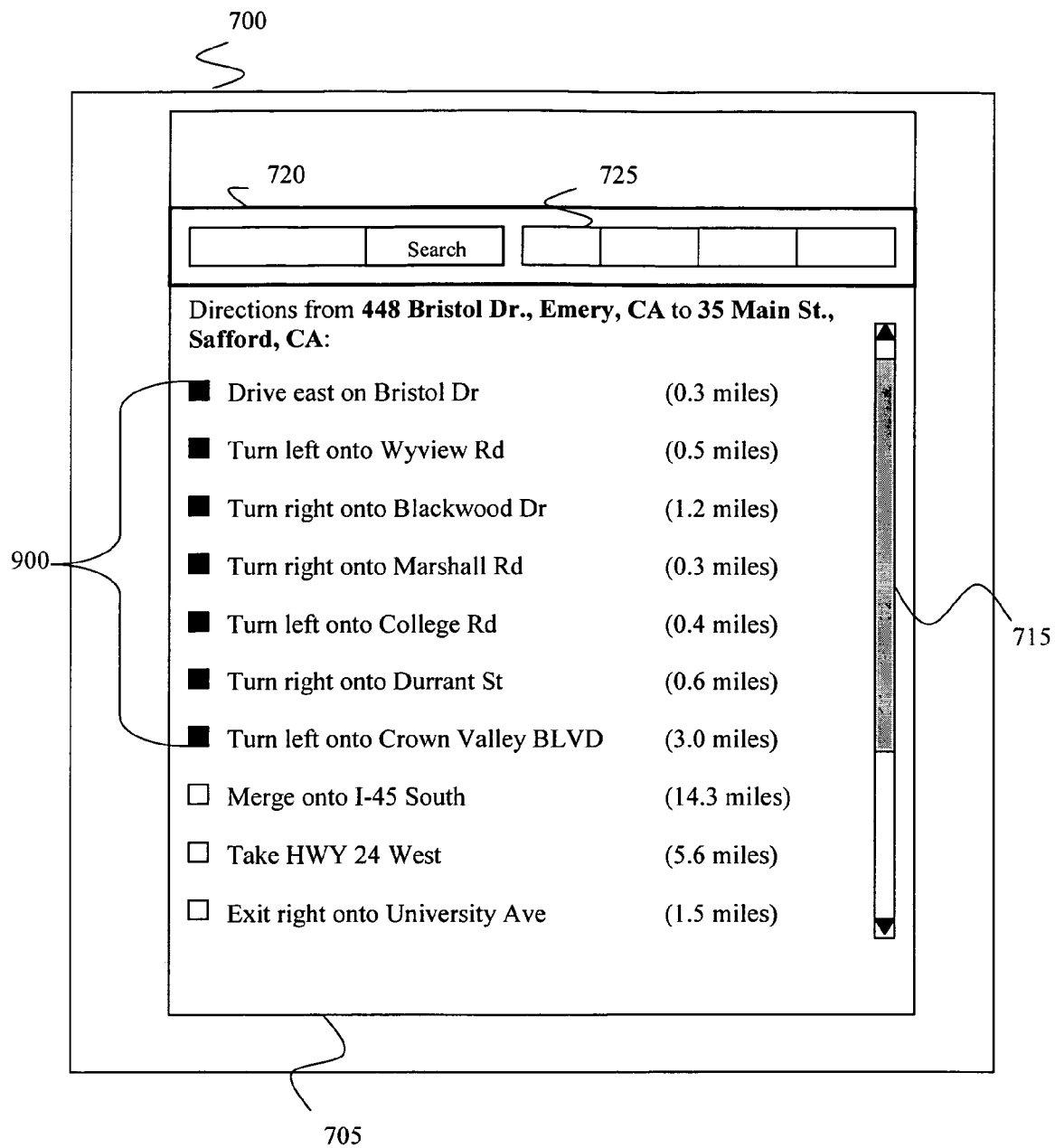

FIG. 9 illustrates how a user is able to select one or more travel actions 710 for customization by the user. Using any appropriate input device 525, the user may select a portion of the travel directions for customization. For example, the selected subset of travel directions is shown as highlighted selection boxes 900 in FIG. 9, which may have been selected by the user clicking a mouse button when a cursor was over the desired travel actions. Although the present example illustrates the user selecting the selected travel actions 900, the user may select any number of one or more travel actions for customization. Also, the user may select one or more travel actions from any portion of the travel directions, such as, e.g., by selecting the travel actions "Turn Right onto Durrant St" and "Turn left onto Crown Valley BLVD" from the travel directions 705 shown in FIG. 7.

Alternatively, the user may use other modes of selection for selecting travel actions, such as, e.g., by highlighting the travel actions instead of selecting the selection boxes 900. Also, the user may select one or more travel actions for customization by selecting travel actions associated with the travel directions that are displayed on a map.

Next, in the example shown in FIG. 9, the user may choose to customize the selected travel actions from the highlighted selection boxes 900 into a replacement travel action by selecting an appropriate button or similar interface mechanism (not shown) with an input device 525. Alternatively, as another example, the user may choose to enter customizations by "right-clicking" in the highlighted or selected area and then choosing to customize the selected travel actions via a drop-down menu or by any other appropriate method of data selection using an input device 525.

Figure 10:
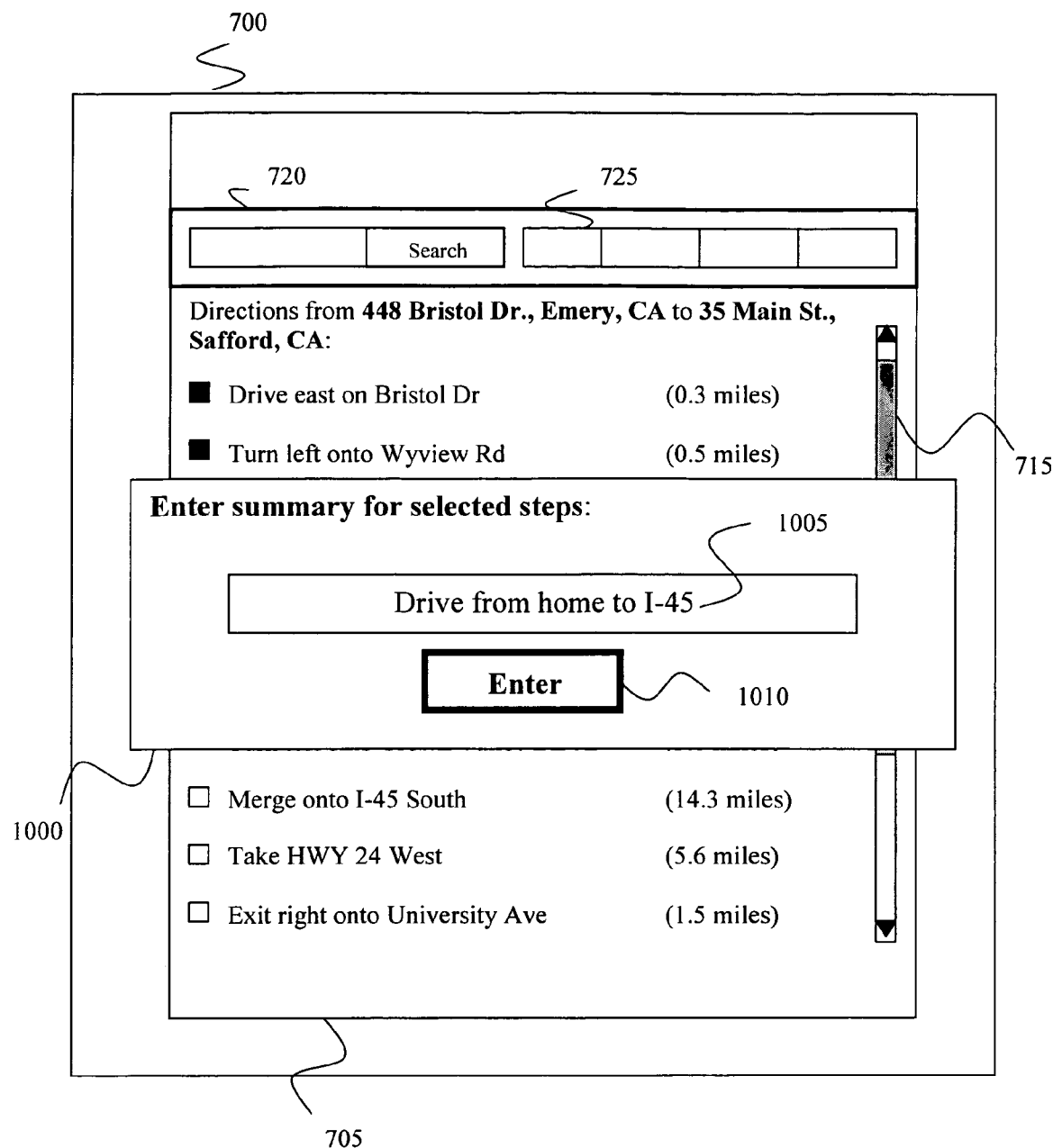

FIG. 10 illustrates an example of how the user may enter a replacement travel action. As shown, the browser 700 displays a user prompt 1000 that allows the user to enter a replacement travel action for the selected travel actions 900 depicted in FIG. 9. In this example, the user has entered a replacement travel action 1005 of "Drive from home to I-45". Many other types of replacement travel actions are possible. For example, without limitation, the replacement travel action may be a summary of the selected steps 900, a short-cut in place of the selected steps 900, an alternate route due to road conditions, or any other type of user description. The shortcut may consist of one or more roads the user would like to use instead of the ones displayed. Alternatively, the user may create a shortcut by providing one or more points the user would like to travel through, which the server 410 would then use to create the shortcut. Moreover, the replacement travel action may be an empty space or an instruction by the user to delete the selected travel action(s) without requiring any further output or display to the user. The user prompt 1000 may include such options (not shown). Alternatively, if the user selects to delete one or more travel actions, the total distance and/or total time associated with the deleted travel action(s) may be added to the travel action preceding the first selected travel action.

Alternatively, the user may also enter user modifications that are associated with the replacement travel action and selected travel actions 900, such as, for example, the user specifying that a replacement travel action only apply during a certain time of day, such as when traffic is much heavier on certain roads. Another user modification may include the user specifying that a replacement travel action only apply for a certain length of time, such as for a month while road work is being completed on a certain road.

As shown in FIG. 10, when the user is finished entering the replacement travel action, the user selects an "Enter" button 1010 using an input device 525. The computing device 400 may then transmit a customization file to the server 410 via the network 405. The customization file may be data containing information associated with the selected travel actions 900, which may include the selected travel actions 900, the replacement travel action 1005, any entered user modifications, and other information such as, e.g., latitude and longitude numbers as will be described below. Also, the customization file may be used for comparison with future requested travel directions, as will be described later. Moreover, the customization file may contain other information related to selected travel actions, such as the travel time or distance associated with each of the selected travel actions 900, the total travel time for the selected travel actions 900, the total distance associated with the selected travel actions 900, or other useful information.

Returning now to FIG. 6, the server 410 receives the customization file (block 615) and stores it (block 620). The server 410 may store the customization file locally, such as in memory 510, storage device 520, or any other appropriate storage device connected to output devices 530. For example, the server 410 may store the customization file along with other information associated with the user, such as in a user profile. Alternatively, the computing device 400 may store the customization file locally on the computing device 400, such as in memory 510, storage device 520, or any other appropriate storage device connected to output devices 530. For example, the customization file may be stored on the computing device 400 in a "cookie" that is stored in a cache (not shown) for the browser 700. The cookie may be associated with a website that is hosted by the server 410. The browser 700 and/or the browser assistant 720 may cause the computing device 400 to store the customization file.

Figure 11:
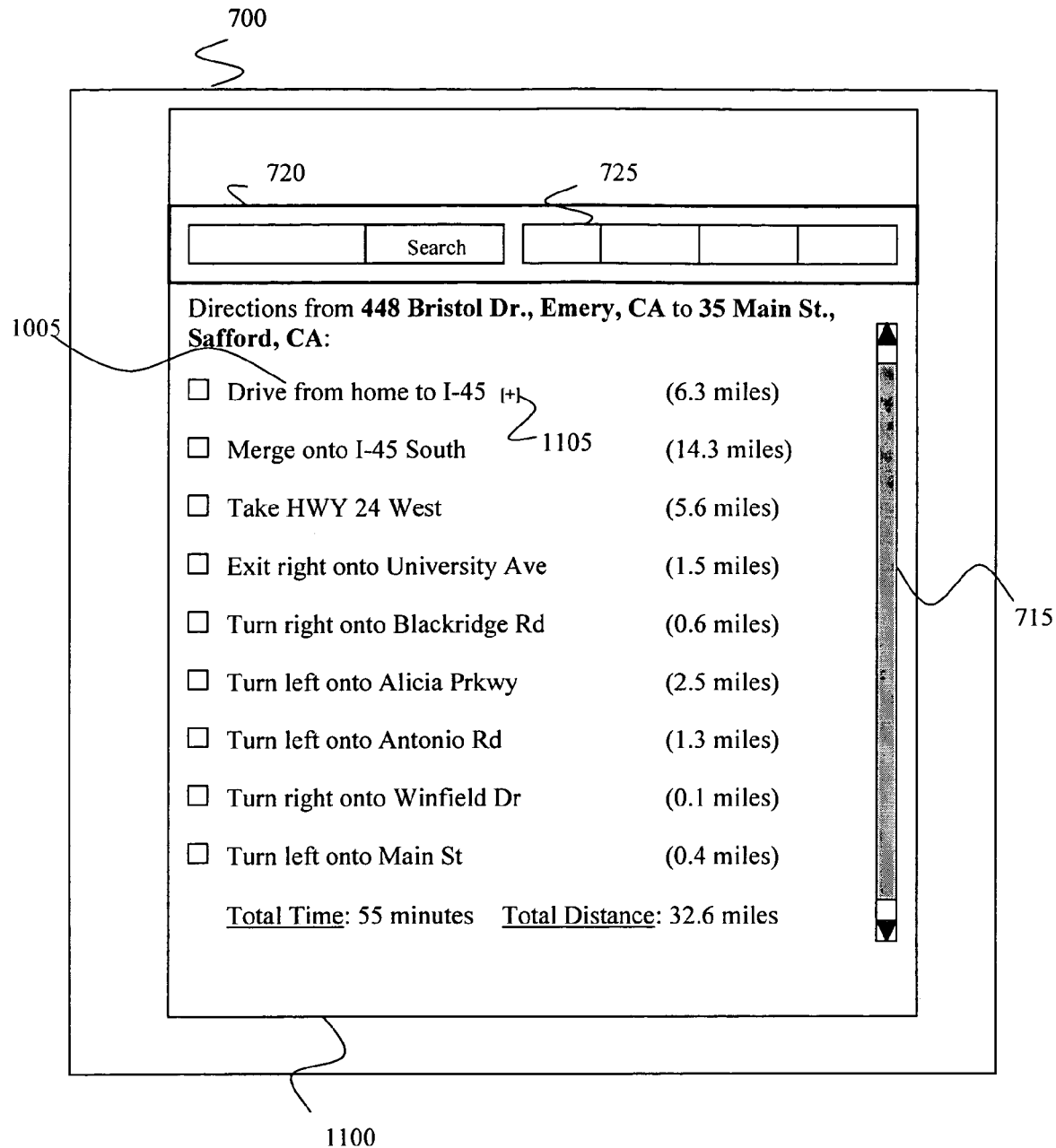

Still referring to FIG. 6, the server 410 creates a new set of travel directions by integrating the replacement travel action 1005 into the determined travel directions. Many methods of integration are possible, such as, e.g., replacing the selected travel actions with the replacement travel action, displaying the replacement travel action in normal font while displaying the selected travel actions in smaller font, creating a map that only displays the non-customized travel actions on the map and so on. According to the present example, the server 410 may replace the selected travel actions 900 with the replacement travel action 1005 and output the new travel directions to the computing device 400 (block 625). FIG. 11 illustrates how new travel directions 1100 are displayed on the browser 700 according to the present example. As shown, the selected travel actions 900 now appear as the replacement travel action 1005 previously entered by the user (i.e., the single travel action labeled "Drive from home to I-45" shown in FIG. 11). The new total distance for the replacement travel action 1005 (6.3 miles) may also have been calculated from the total mileage from the selected travel actions 900. Also, the selected travel actions 900 may be deleted without displaying a replacement travel action or a replacement travel action consisting of an empty space may be displayed. In another alternative, the server 410 may transmit the selected travel actions 900 with the new travel directions.

A button or link may also be provided that allows the user to view the selected travel actions associated with a replacement travel action. For example, a first replacement travel action button 1105 may be provided that allows the user to view the selected travel actions 900 that were replaced with the replacement travel action 1005. Using an input device 525, the user may select the first replacement travel action button 1105, which then causes the browser 700 to also display the selected travel actions 900 from FIG. 9. The selected travel actions 900 may be displayed below the replacement travel action 1005, or, alternatively, the replacement travel action 1005 may be replaced by the selected travel actions 900 when the first replacement travel action button 1105 is selected. Moreover, the selected travel actions 900 may be displayed so as to distinguish these actions from the rest of the travel directions, such as by indenting them from the rest of the travel actions in the new travel directions 1100.

Figure 11A:
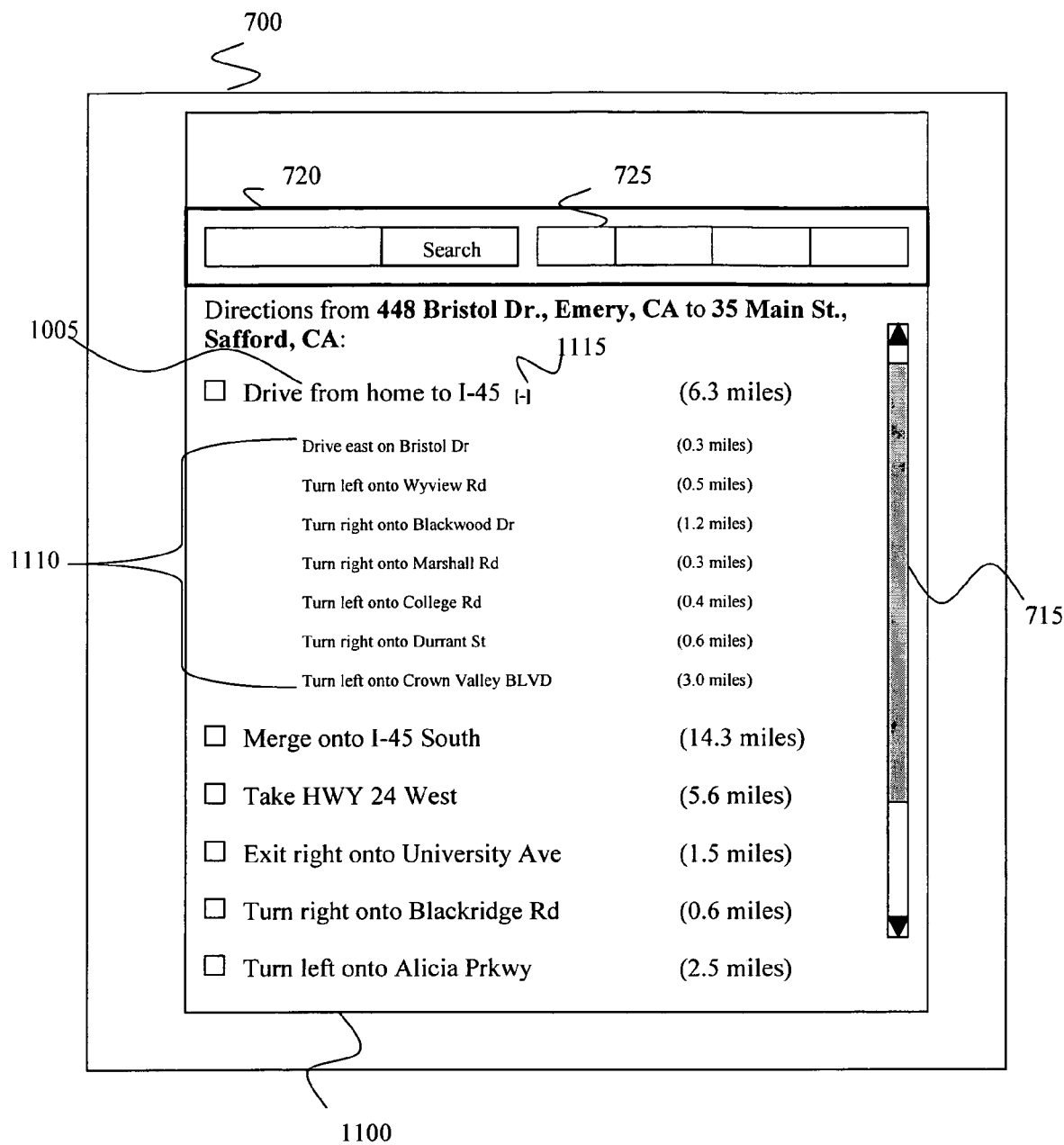
FIG. 11A illustrates an example of how previously selected travel actions may be displayed along with an integrated replacement travel action.

FIG. 11A illustrates an example of how previously selected travel actions may be displayed along with an integrated replacement travel action. Here, the user selected the first replacement travel action button 1105 from FIG. 11, which caused the browser 700 to display the previously selected travel actions 1110 below the replacement travel action 1005. A second replacement travel action button 1115 may also be provided. Alternatively, the user may be allowed to select one or more previously selected travel actions 1110 (such as, e.g., by providing selection boxes) for further customization as has been described above. When the second travel action button 1115 is selected, the previously selected travel actions 1110 may be removed from the display and only the replacement travel action 1005 may be shown, as illustrated in FIG. 11.

Alternatively, one or more of the blocks 600 to 625 of FIG. 6 may be implemented on the computing device 400 by the browser 700 or the browser assistant 720. For example, the browser assistant 720 may allow the user to select travel actions from displayed travel directions, such as displayed travel directions 705 shown in FIG. 9. Still referring to FIG. 9, after the user selects highlighted travel actions 900, the user may select a "Travel Directions Customization" button 725 on the browser assistant 720. The browser assistant 720 may then provide the user prompt 1000 to the user and receive the replacement travel action 1005. The browser assistant 720 may then integrate the replacement travel action 1005 into the travel directions and output the new travel directions to the user as shown in FIG. 11. The browser assistant 720 may also provide the replacement travel action button 1105 to allow the user to view the travel actions that were replaced as described previously. Further, the browser assistant 720 may also store a customization file associated with the selected travel actions 900, the replacement travel action 1005, and any entered user modifications on the computing device 400. Alternatively, the browser assistant 720 and/or browser 700 may perform some or all of blocks 600 to 625 from FIG. 6 in conjunction with the server 410 and/or a second server (not shown) connected to the network 405 as described above.

Figure 12:
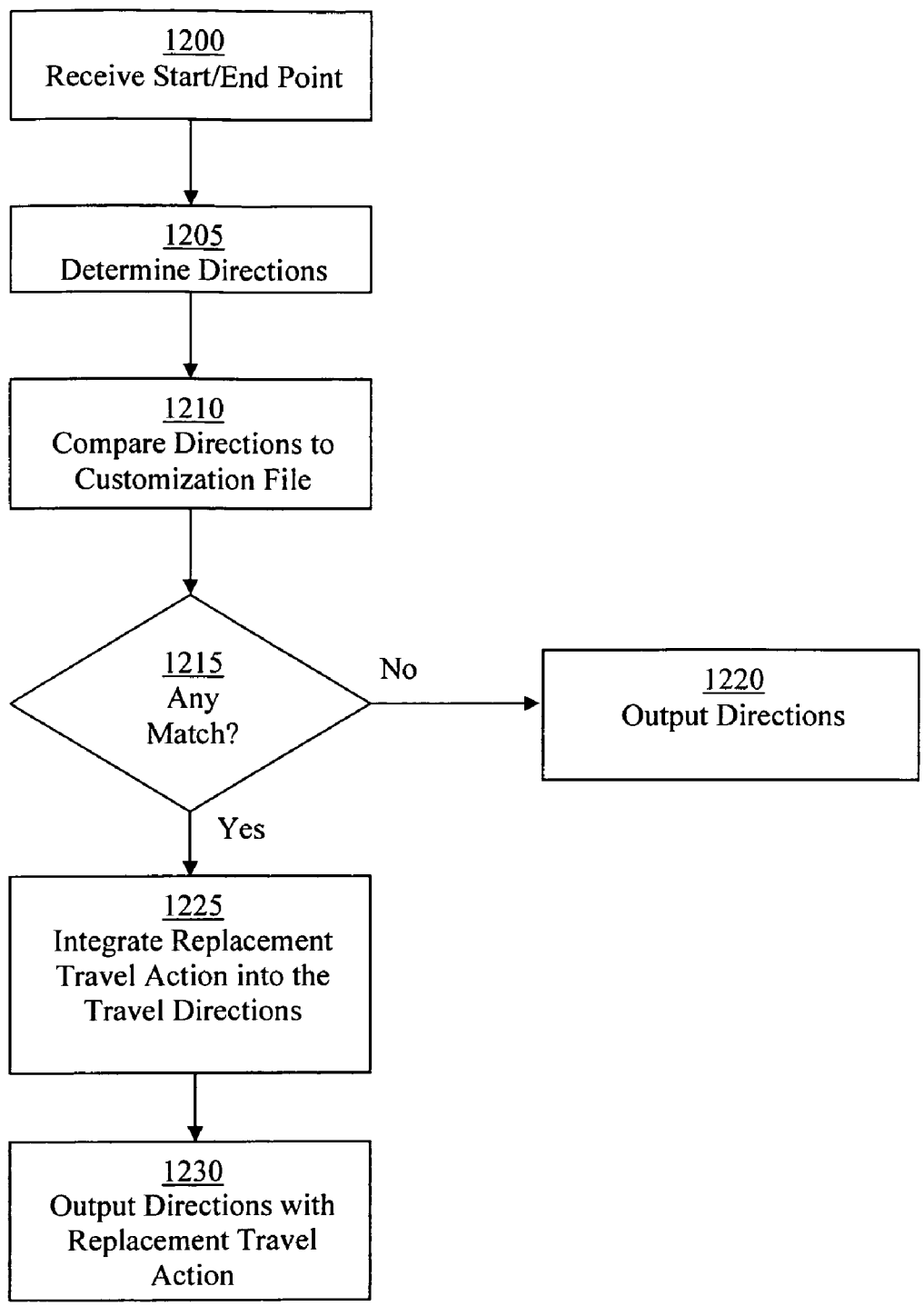
FIG. 12 shows a flow chart diagram of another embodiment of how the server may be used to customize travel directions.
Figure 13:
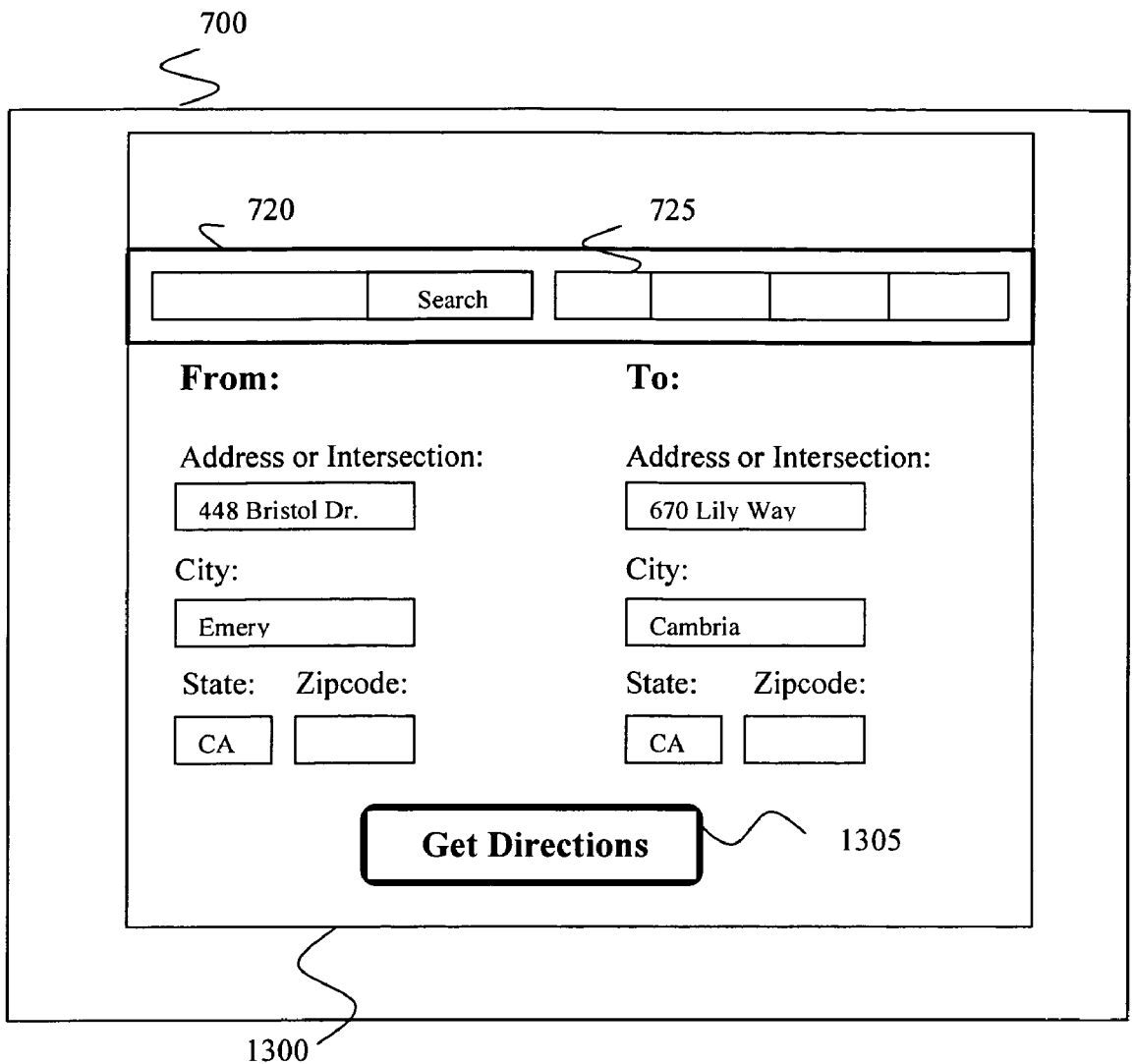
FIGS. 13–15 provide an example of certain aspects of this embodiment.
Figure 14:
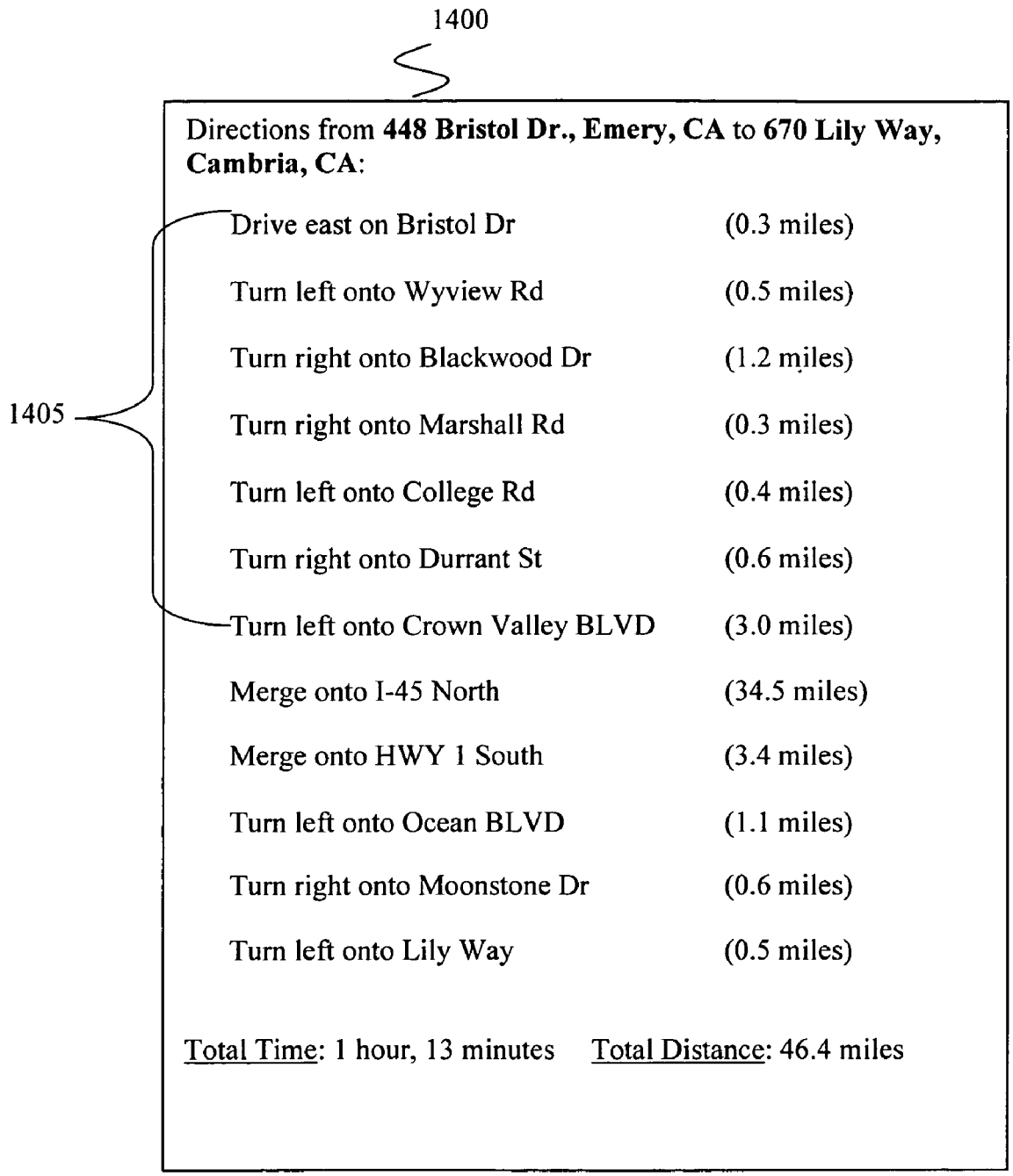
Figure 15:
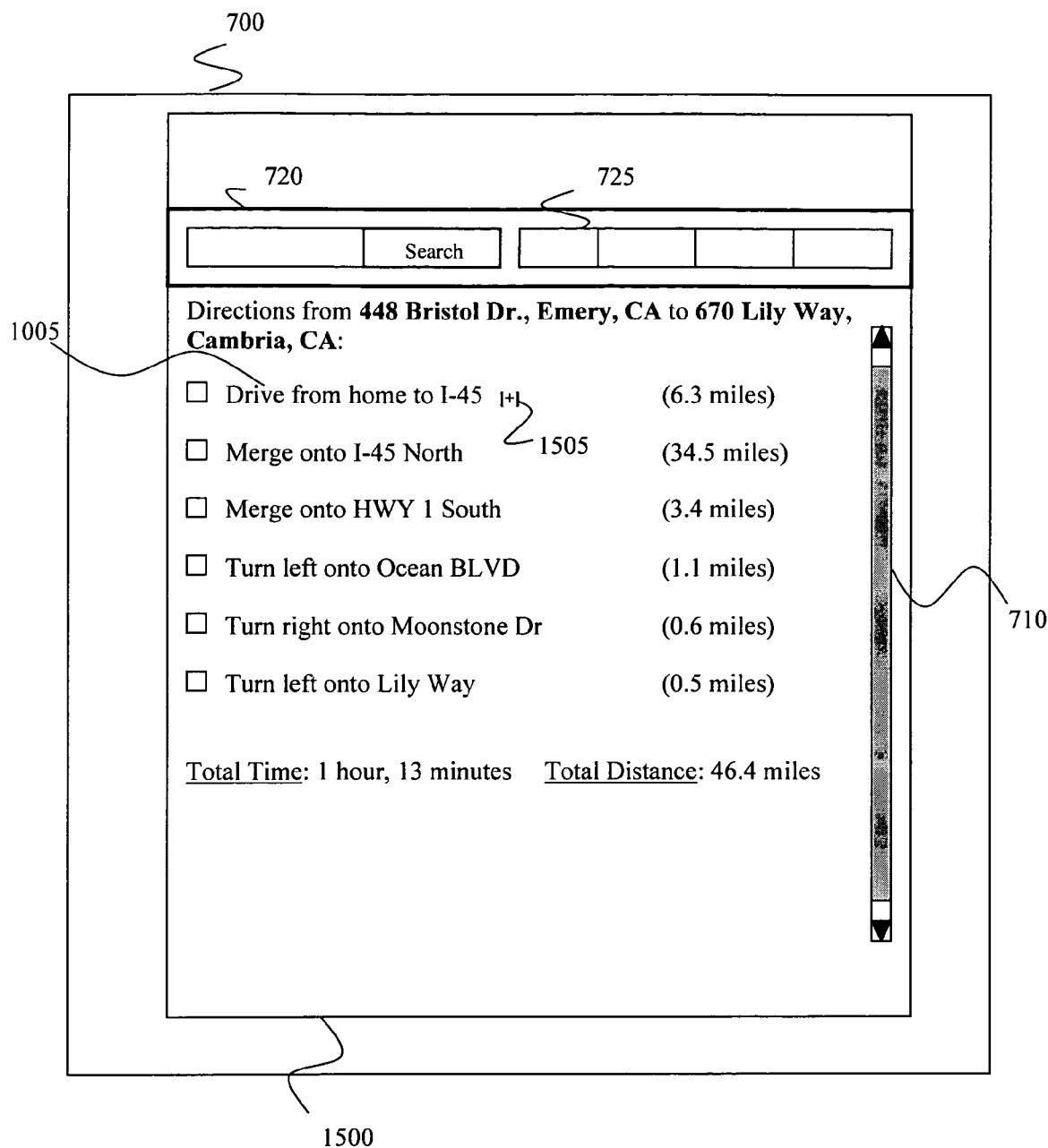

FIG. 12 is a flow chart diagram illustrating how server 410 may be used to customize travel directions in another embodiment. FIGS. 13–15 provide an example of certain aspects of this embodiment.

Referring to FIG. 12, the server receives a start point and end point (block 1200) and determines requested travel directions (block 1205) in a manner as described previously. An example of this step is illustrated in FIG. 13. As shown, a travel direction data entry page 1300 is displayed on the browser 700. The user has entered a start point of 448 Bristol Dr., Emery Calif. and an end point of 670 Lily Way, Cambria Calif. into the travel direction data entry page 1300. In this example, the user then selects a "Get Directions" button 1305 to determine travel directions. This action causes the start point and end point to be transmitted to the server 410 via the network 405. FIG. 14 illustrates determined travel directions 1400 that were then generated by the server 410 based on the received start point and end point.

The server 410 then compares the determined travel directions 1400 to previously stored customization files (block 1210 in FIG. 12). The process of comparing travel directions with a customization file to find a match (block 1215 of FIG. 12) may proceed according to the flow chart diagram illustrated in FIG. 12A. An example of the process is also provided in reference to the determined travel directions 1400 and the customization file containing selected travel actions 900 and the replacement travel action 1005 as described above.

Figure 12A:
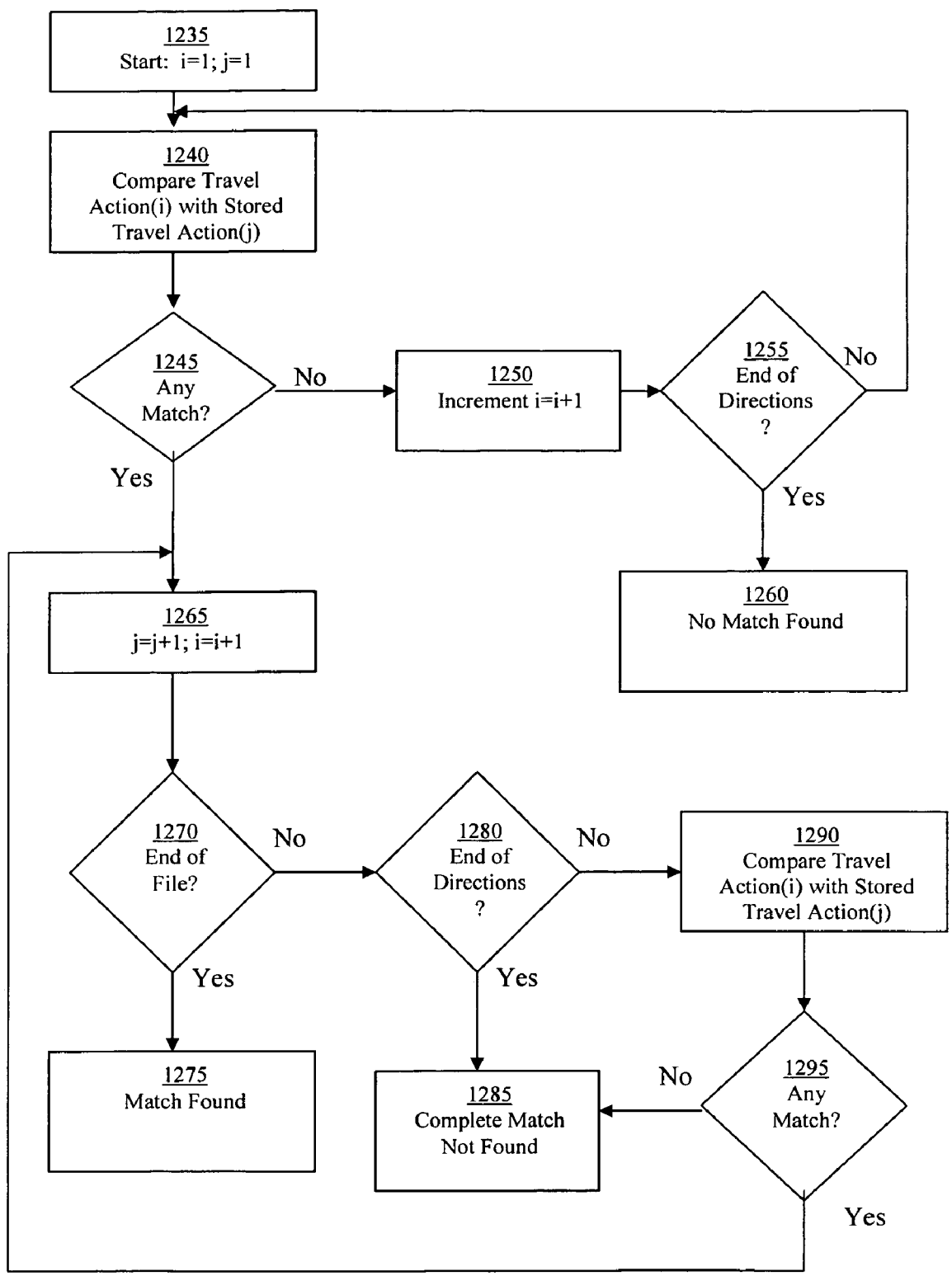
FIG. 12A illustrates an example of the process of comparing travel directions with a customization file to find a match.

As shown in FIG. 12A, counters i and j are initialized to i=1 and j=1 (block 1235). Travel action(i) from the determined travel directions is then compared to the stored travel actions) from the customization file (block 1240) to see if a match is found (block 1245). In the present example, the server 410 compares the first travel action from the determined travel directions 1400 ("Drive east on Bristol Dr"

shown in FIG. 14) with the first travel action from the selected travel actions 900 stored in the customization file ("Drive east on Bristol Dr" shown in FIG. 9) and determines that the compared travel actions match.

Referring back to FIG. 12A, if a match is not found, the counter i is incremented to i=i+1 (block 1250) and the server 410 determines whether the end of the travel directions has been reached (block 1255). If the end of the travel directions has been reached, then a match has not been found (block 1260) and the server 410 may start the process again for another customization file. But if the end of the travel directions has not been reached, the server 410 compares the next travel action from the determined travel directions with the stored travel action from the customization file (block 1240).

If a match is found after block 1245, the counters are incremented so that j=j+1 and i=i+1 (block 1265). According to the present example, a match was found from the first travel action from the determined travel directions 1400 and the first travel action from the selected travel actions 900 from the stored customization file (FIGS. 9 and 14). The server 410 then determines if the end of the customization file has been reached (block 1270). If the end of the customization file has been reached, the server 410 has found a match between a portion of the travel directions and all of the travel actions in the customization file (block 1275).

But if the end of the customization file has not been reached, the server 410 determines whether the end of the travel directions has been reached (block 1280). If the end of the travel directions has been reached, a complete match between a portion of the travel directions has not been found in the customization file (block 1285) although one or more matches were found with a portion of the stored travel actions in the customization file. The server 410 may the in compare additional customization file(s) with the determined travel directions according to FIG. 12A. Alternatively, in block 1285, the server 410 may obtain a replacement travel action for the travel actions that were found to match and create a second customization file as described above. According to the present example, the end of the determined travel directions 1400 and the end of the selected travel actions 900 have not been reached as can be seen in FIGS. 9 and 14.

Referring back to FIG. 12A, if the end of the travel directions has not been reached, then the next travel action from the travel directions is compared with the next stored travel action from the customization file (block 1290) to determine if there is a match (block 1295). If there isn't a match, a complete match has not been found as described in block 1285. But if a match is found, the server 410 returns to block 1265 to continue the process as described above until block 1275 or block 1285 is reached. According to the present example, the second travel action of the determined travel directions 1400 ("Turn left onto Wyview Rd" from FIG. 14) matches with the second travel action of the selected travel actions 900 ("Turn left onto Wyview Rd" from FIG. 9). And thus the process continues as described above until the last matching travel actions are reached (i.e., "Turn left onto Crown Valley BLVD" from FIGS. 9 and 14). Alternatively, the browser 700 and/or the browser assistant 720 may execute the flow chart diagram of FIG. 12A.

Referring again to FIG. 12, if a match is not found upon execution of block 1215 as described above (i.e., block 1260 or block 1285 in FIG. 12A was reached), the server 410 outputs the determined travel directions 1400 to the computing device 400 without modification (block 1220). On the other hand, if there is a match between selected travel actions in a customization file and travel actions from the determined travel directions (block 1275 in FIG. 12A), the replacement travel action from the customization file is integrated with the travel directions (block 1225 of FIG. 12). According to the present example, a subset of determined travel actions (collectively labeled as 1405 in FIG. 14) were determined to match the selected travel actions 900 from FIG. 9. Accordingly, the server 410 determines that the determined travel actions 1405 match with the stored travel actions from the customization file created as described in the example above for FIGS. 6–11.

At this point, the server 410 then outputs the new travel directions, with the integrated replacement travel action (block 1230 of FIG. 12). According to the present example, FIG. 15 shows the browser 700 displaying a travel directions web page 1500 that was received from the server 410 after execution of block 1230 in FIG. 12. As shown, the travel directions webpage 1500 displays the replacement travel action 1005 in place of the determined travel actions 1405 from FIG. 14.

Alternatively, the server 410 may also output the matching travel actions 1405 in block 1230 of FIG. 12. As shown in FIG. 15, a replacement travel action button 1505 is provided that, when selected by the user, may cause the browser 700 to also display the determined travel actions 1405 as was described previously for FIG. 11A.

Figure 15A:
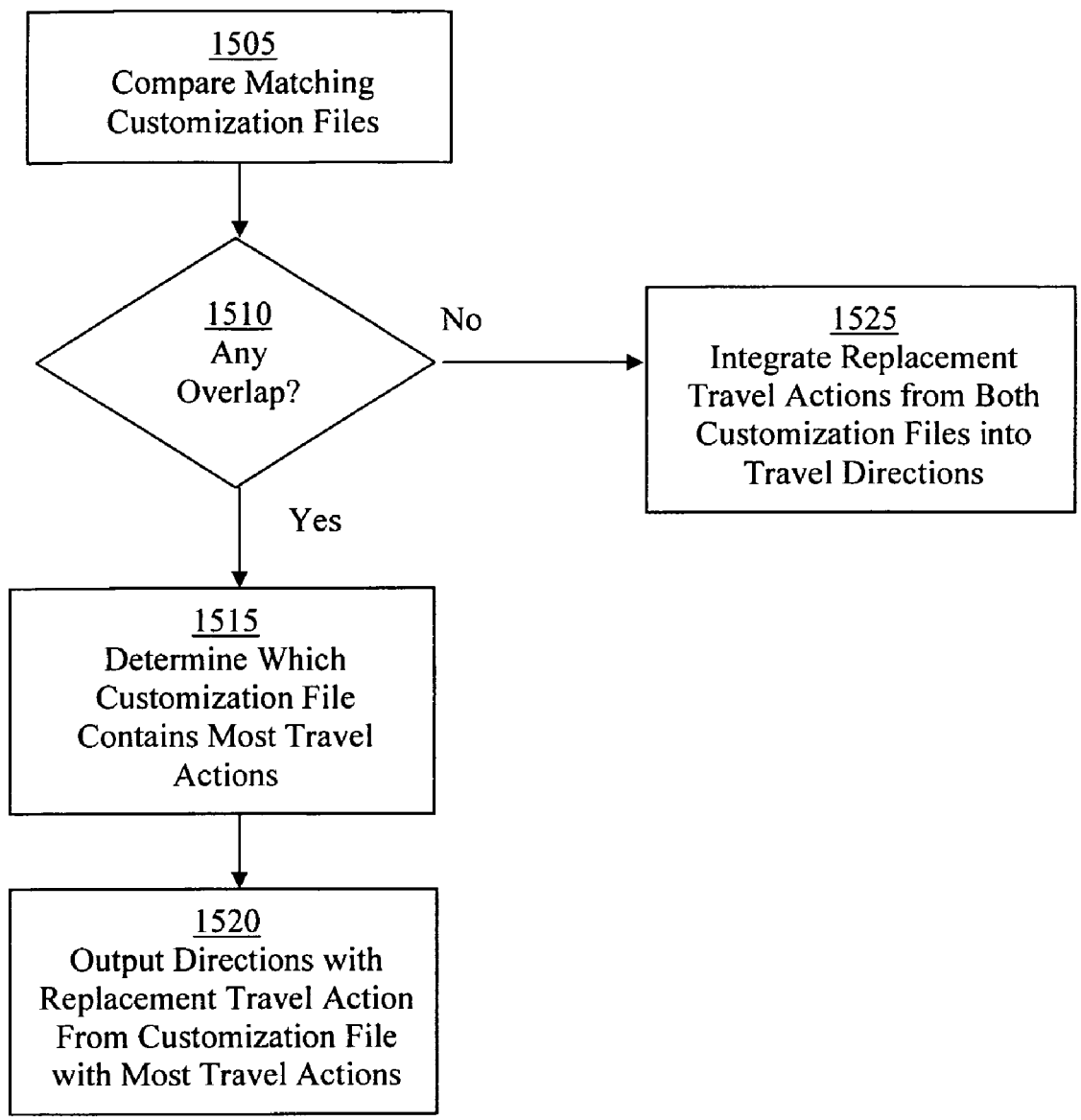
FIG. 15A illustrates an exemplary flow chart diagram for the situation where more than one customization file is found to match determined travel directions.

Although only one replacement travel action 1005 is shown in FIG. 15, it is possible that other customization files may be found to match the determined travel directions, which may then result in additional replacement travel actions being output and/or displayed. FIG. 15A illustrates an exemplary flow chart diagram for the situation where more than one customization file is found to match determined travel directions. For ease of discussion, FIG. 15B provides exemplary data for use with the flow chart diagram of FIG. 15A. As illustrated in FIG. 15B, determined travel directions 1525 contain determined travel actions 1530. Also, a first set of travel actions 1535 is shown from a first matching customization file 1540 and a second set of travel actions 1545 is shown from a second matching customization file 1550. For ease of discussion, other data from the matching customization files 1540 and 1550 and/or the determined travel directions 1525 is not illustrated.

Referring back to FIG. 15A, the server 410 may compare the travel actions from the matching customization files (block 1505) and determine if there is any overlap (block 1510). According to the example in FIG. 15B, the server 410 determines that two travel actions from the first and second matching customization files 1540 and 1550 overlap ("Turn right onto Marshall Rd" and "Turn left onto College Rd").

If the server 410 determines that there is overlap, the server 410 may then determine which customization file contains the most travel actions (block 1515), and in the exemplary embodiment output new travel directions integrating the associated replacement travel action (block 1520). According to the example in FIG. 15B, the server 410 determines that the second matching customization file 1550 has the most travel actions (four travel actions as compared to three travel actions from the first matching customization file 1540). The server 410 integrates the replacement travel action (not shown) from the second matching customization file 1550 into the determined travel directions 1525 to create a new set of travel directions, such as, e.g., by replacing the travel actions that match with the second set of travel actions 1545 with the replacement travel action as described previously.

If the customization files both contain the same amount of travel actions, in one exemplary embodiment the customization file with the travel action occurring first in the travel directions may be output. But if no overlap was found in block 1510, the server 410 may integrate and output the replacement travel actions from the first and the second matching customization files with the travel directions (block 1525).

Other alternative ways of dealing with multiple matching customization files may be apparent to those of ordinary skill in the art. For instance, blocks 1515 and 1520 may be changed so that the replacement travel action from the customization file that has the first matching stored travel action is used, regardless of the amount of travel actions. In this situation, the replacement travel action from the first matching customization file 1540 would be used because its first travel action ("Turn right onto Blackwood Dr" from FIG. 15B) appears first in the determined travel directions 1525. Another alternative may include outputting the travel directions with two replacement travel action buttons associated with the first and second matching customization files (such as a button similar to the second replacement travel action button 1115 in FIG. 11A) that may be displayed next to the first travel action in the travel directions that matches with the first travel action in a customization file. If a replacement travel action button is selected, then the associated travel actions may be collapsed and the associated replacement travel action may be displayed. This action may also cause a second replacement travel action button to not be displayed if one or more of its associated travel actions are subsumed in the displayed replacement travel action. In another alternative, the server 410 may determine not to integrate any replacement actions from matching customization files that are found to overlap. Another alternative may include comparing the distance or time covered by the matching travel action(s) and using the replacement travel action associated with the travel action(s) that cover the most distance or time. Furthermore, the computing device 410, including the browser 700 and/or the browser assistant 720, may perform one or more of the blocks described in FIG. 15A.

Alternatively, one or more of the blocks 1200 to 1295 from FIGS. 12 and 12A may be implemented on the computing device 400 by the browser 700 and/or the browser assistant 720. For example, the browser assistant 720 may receive the determined travel directions 1400 from the server 410 and establish whether any travel actions in the determined travel directions 1400 match with any stored customization files. According to the present example, the browser assistant 720 may establish that determined travel actions 1405 match with the previously stored customization file as described above. The browser assistant 720 may then integrate the replacement travel action 1005 and output the new travel directions to the user, such as, e.g., shown in FIG. 15. Alternatively, the browser assistant 720 and/or browser 700 may perform some or all of blocks 1200 to 1295 in conjunction with the server 410 and/or a second server (not shown) connected to the network 405 as described above. For example, the server 410 may implement blocks 1200–1215 and 1235–1295 from FIGS. 12 and 12A and transmit the determined travel directions 1400 together with the customization file associated with the replacement travel action 1005 to the computing device 400. The browser assistant 720 may then integrate the replacement travel action 1005 into the travel directions and implement any user modifications in the customization file. Other alternatives will be apparent to those of ordinary skill in the art.

Figure 16:
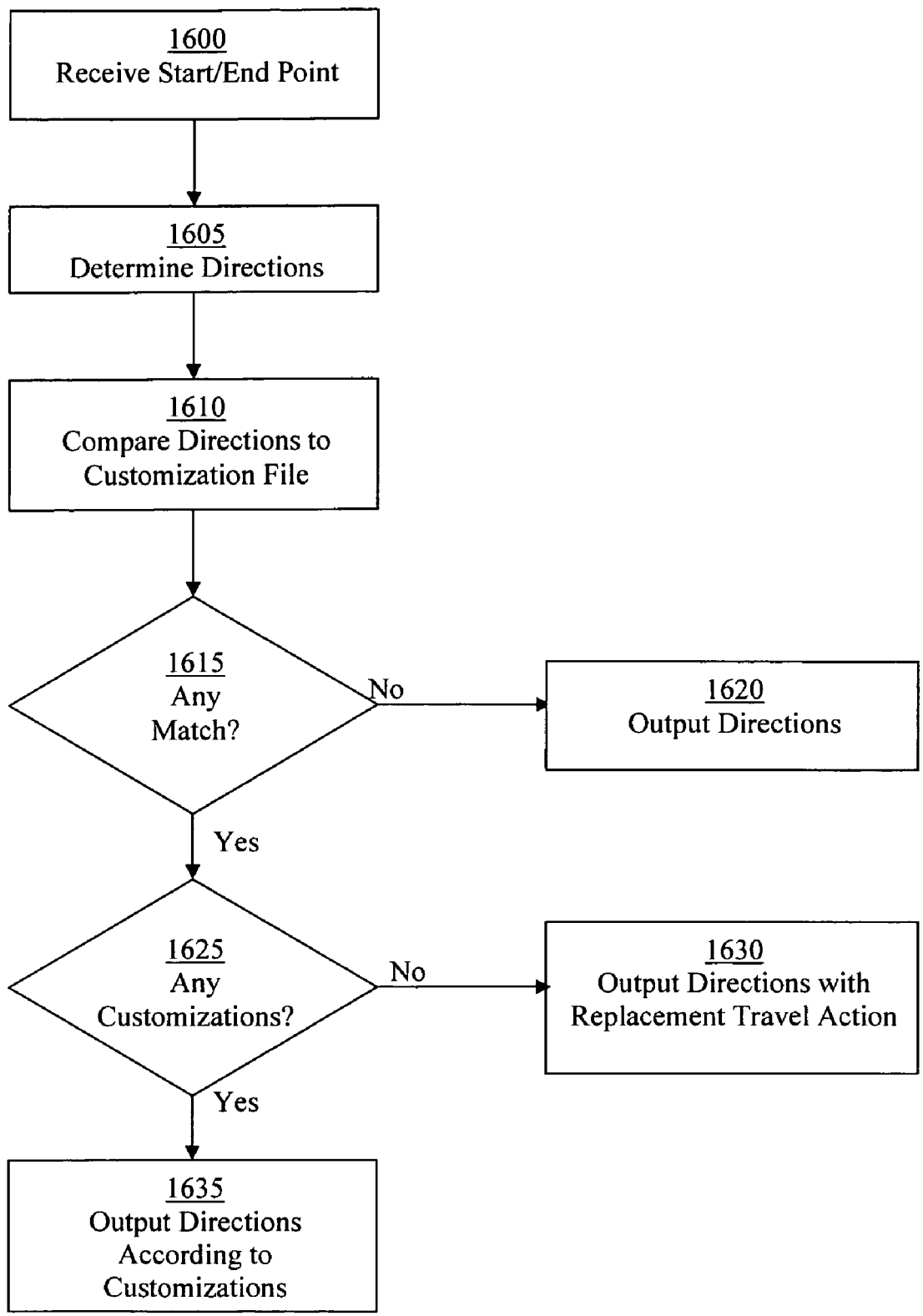
FIGS. 16–18 illustrate flowchart diagrams for customizing travel directions according to other embodiments.

FIG. 16 illustrates a flowchart diagram for customizing travel directions according to another embodiment. A start and an end point are received by the server 410 (block 1600) and travel directions are determined according to the start and end point (block 1605). The server 410 compares travel actions from the determined directions to previously stored customization files (block 1610). At this point, a determination is made whether there is any match between the determined directions and the selected travel actions stored in the customization file as described above (block 1615). If no match is found, the determined directions are output to the user (block 1620). But if there is a match, it is determined whether there are any user modifications stored in the customization file (block 1625). If there are not any user modifications, the replacement travel action is integrated with the determined directions and output as described above (block 1630). On the other hand, if there are user modifications, the travel directions are output according to the user modifications as described above (block 1635). Alternatively, one or more of the blocks 1600 to 1635 may be implemented by the browser 700 and/or the browser assistant 720 on the computing device 400, the server 410, and/or another server (not shown) as described previously.

Figure 17:
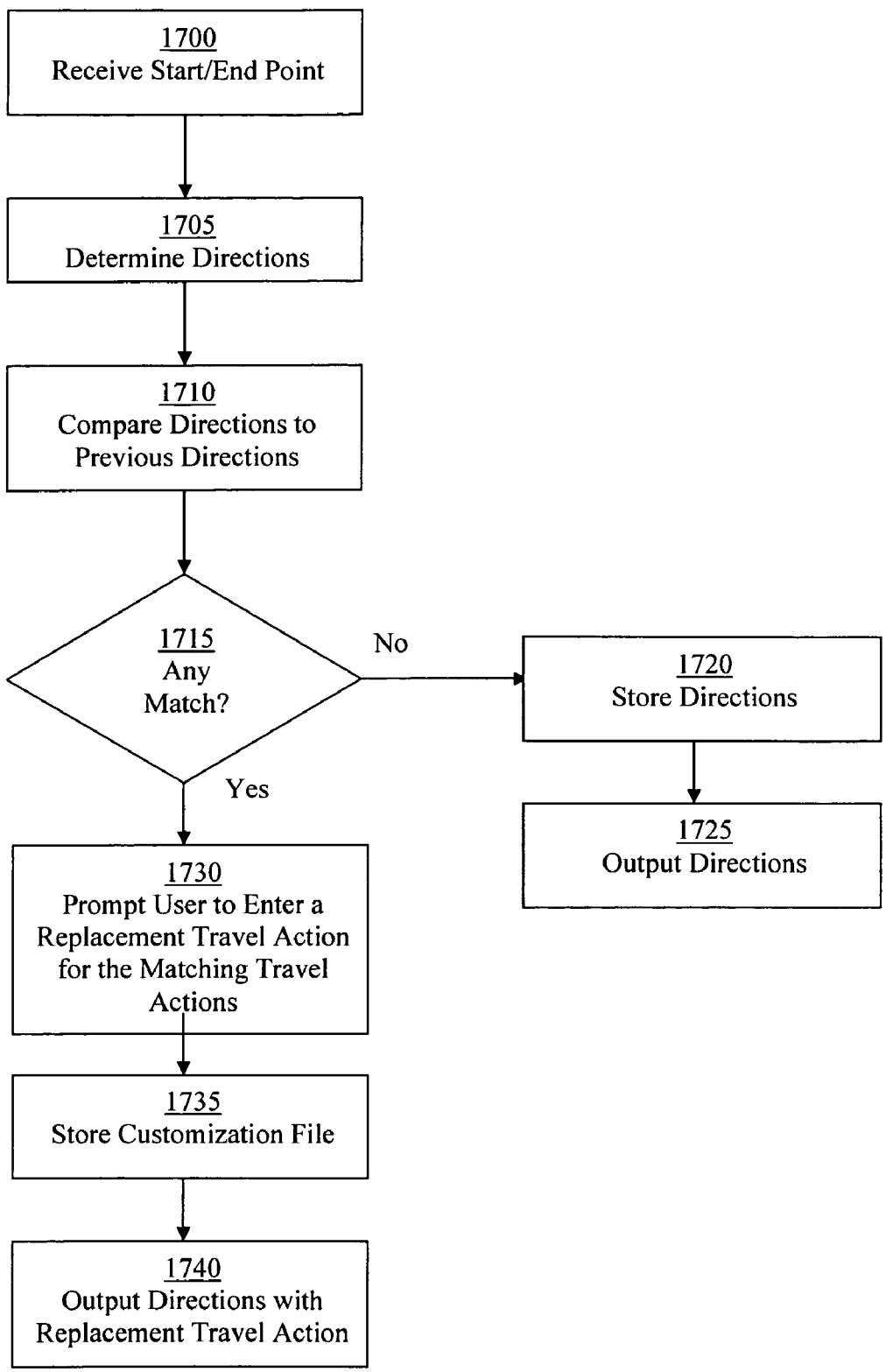

FIG. 17 illustrates a flow chart diagram for customizing travel directions according to another embodiment. A start and end point are received by the server 410 (block 1700), and directions are determined (block 1705) as described previously. Travel actions from the determined directions are compared to travel actions that have been previously determined for the same user (block 1710). Any match between the determined directions and the previously determined travel actions is detected (block 1715) using the process described in FIG. 12A. If no match is found, the determined directions are stored (block 1720) and output to the user (block 1725). But if a match is found as described previously, the user may be notified of the match and/or prompted to enter a replacement travel action of the matching travel actions (block 1730), which is then stored along with the matching travel actions in a customization file for future reference (block 1735). Alternatively, the user may provide further user modifications. The replacement travel action is integrated with the determined directions and the new travel directions are output to the user (block 1740). Alternatively, the user may decline to enter a replacement travel action or the user may only be notified of a match if a certain threshold of matches is reached, such as, e.g., only notifying the user if at least three matches are found. In another alternative, the user may only be notified of a match if a second threshold is exceeded for the number of times the same match has been identified, such as, e.g., notifying the user if more than three requested travel directions have contained travel actions that are the same. Also, one or more of the blocks 1700 to 1740 may be implemented by the browser 700 and/or the browser assistant 720 on the computing device 400, the server 410, and/or another server (not shown) as described previously.

Figure 18:
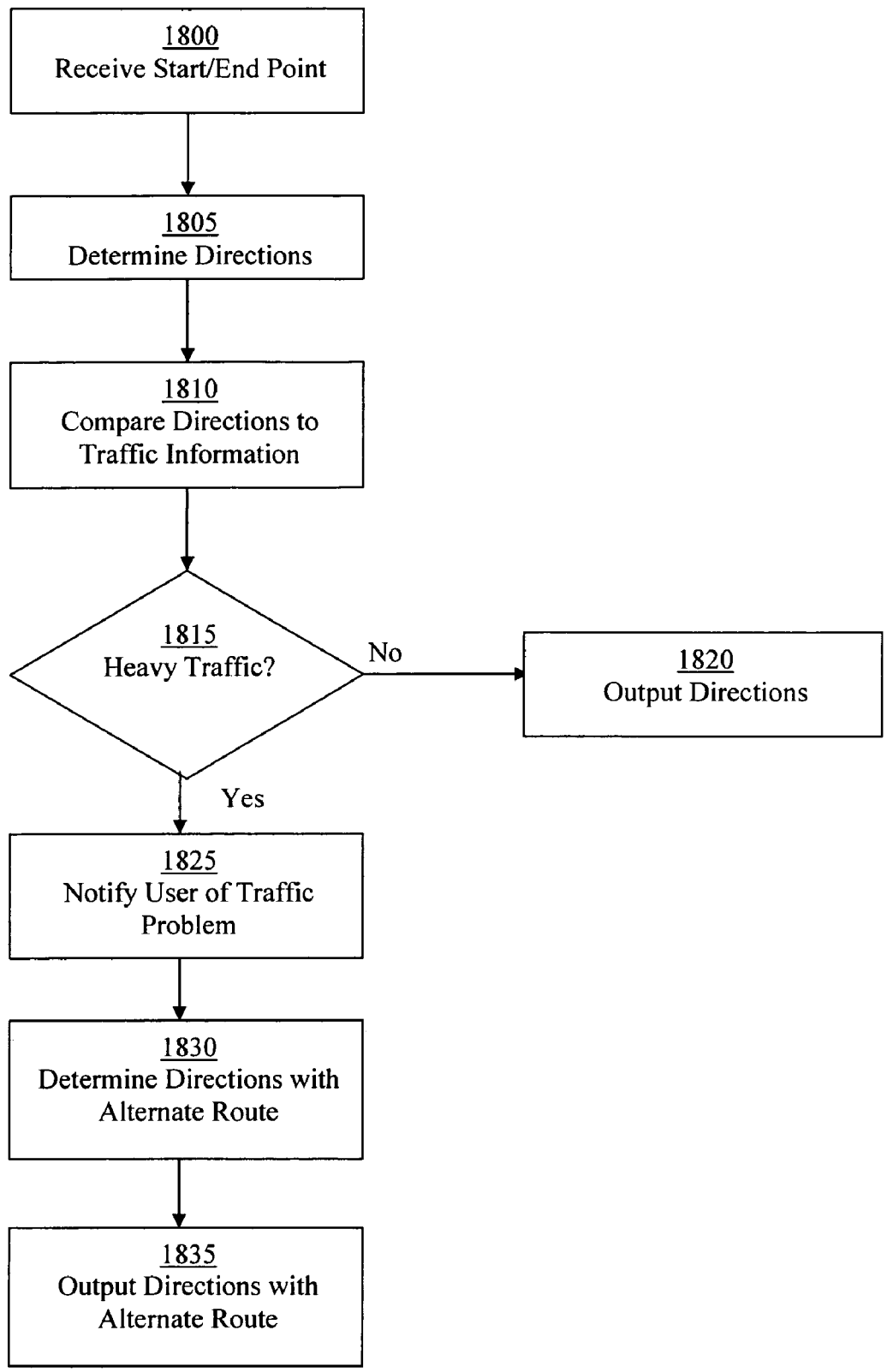

FIG. 18 is a flowchart diagram for customizing travel directions according to another embodiment. A start and end point are received by the server 410 (block 1800) and travel directions are determined (block 1805) as described previously. Travel actions from the determined directions are then compared to traffic information (block 1810) obtained via network 405 by any of the well-known and commercially available means. At this point, it is determined whether there is heavy traffic associated with the determined travel directions (block 1815). If there isn't, the directions are output to the user (block 1820). If there is heavy traffic associated with the determined travel directions, the user is notified of the traffic problem (block 1825). Directions are also determined with an alternate route (block 1830) and are output to the user (block 1835). Alternatively, the user may be presented with a choice to receive the initial travel directions or the directions with an alternate route. Also, one or more of the blocks 1800 to 1835 may be implemented by the browser 700 and/or the browser assistant 720 on the computing device 400, the server 410, and/or another server (not shown) as described previously.

Figure 19:
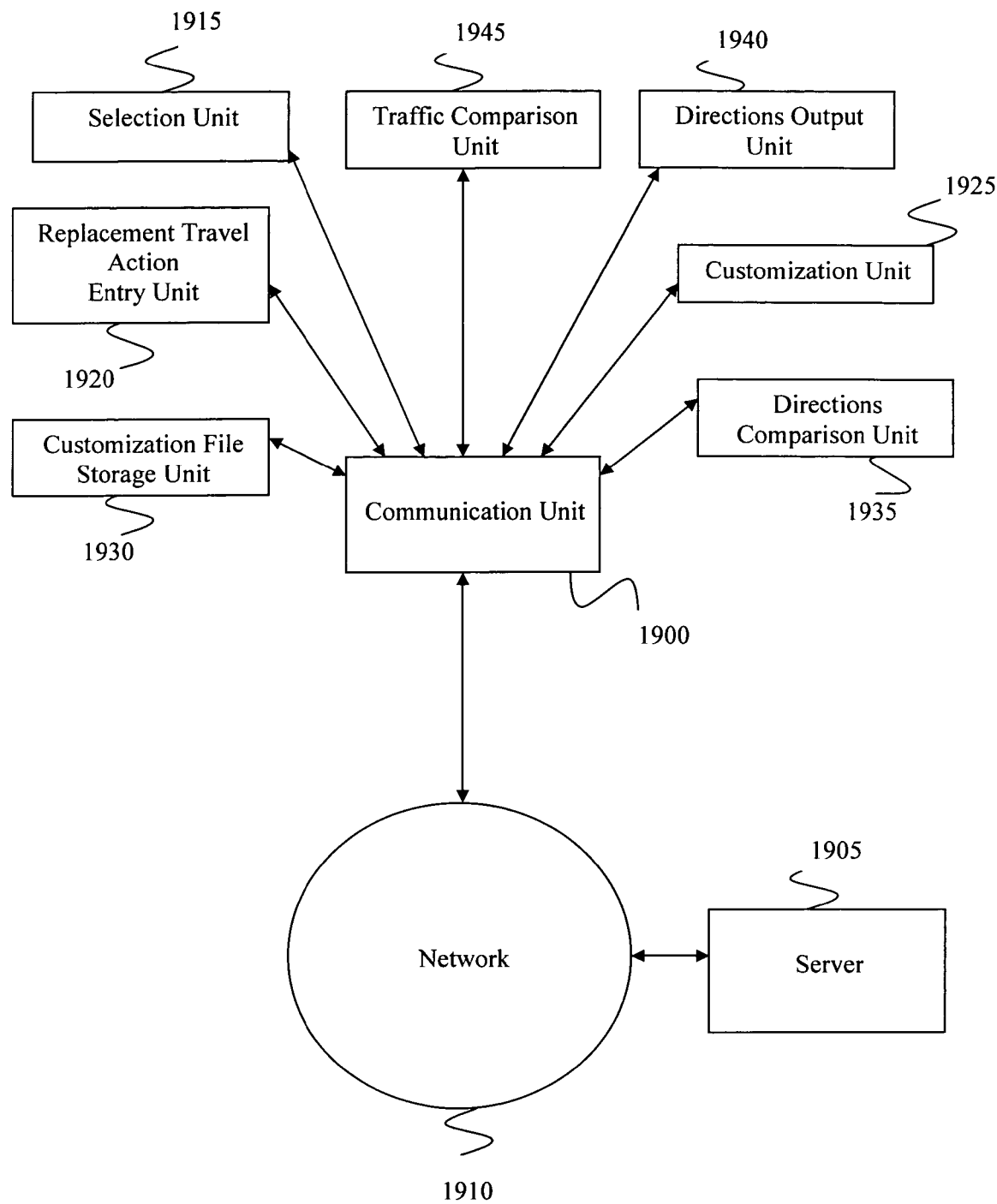
FIG. 19 shows an apparatus for customizing travel directions according to another embodiment.

FIG. 19 shows an apparatus for customizing travel directions according to another embodiment. A communication unit 1900 may receive travel directions from a server 1905 via a distributed network 1910. Alternatively, the distributed network 1910 may be a direct connection between the communication unit 1900 and the server 1905. A selection unit 1915 receives the travel directions from the communication unit 1900. The selection unit 1915 allows the user to select portions of the travel directions for customization. The selected travel actions from the travel directions may occur via any method as described previously. Once travel actions have been selected, a replacement travel action entry unit 1920 prompts the user to enter a replacement travel action of the selected travel actions, which may include information as described previously. A customization unit 1925 allows a user to enter user modifications for the selected travel actions and the entered replacement travel action as described above. A customization file storage unit 1930 then stores a customization file containing the selected travel actions, the entered replacement travel action, and any user modifications. A directions output unit 1940 may output new travel directions with the replacement travel action integrated as described above.

A directions comparison unit 1935 may compare the received travel directions with previously stored customization files to determine whether there are any matches between portions of the travel directions and any stored customization file as described above. If a match is found, the directions output unit 1940 outputs the travel directions with the replacement travel action from the customization file integrated into the travel directions. Also, the directions comparison unit 1935 may compare the travel directions with previously obtained directions to determine whether there are travel actions from the received travel directions that are the same as travel actions from previous travel directions. If one or more portions are the same, the directions output unit 1940 may prompt the user to enter a replacement travel action of the matching travel actions and any user modifications. If the user enters a replacement travel action, the directions output unit 1940 outputs the travel directions with the replacement travel action integrated therein. Moreover, the customization file storage unit 1930 may store a new customization file containing the matching travel actions, replacement travel action, and any user modifications.

A traffic comparison unit 1945 may compare the travel actions from the travel directions with existing traffic. If an unacceptable level of traffic on the travel directions is detected, the traffic comparison unit 1945 may obtain alternate directions and/or notify the user of the problem. Further, the directions output unit 1940 may output the travel directions with the alternate directions integrated therein.

In another embodiment, a map server (not shown) may also be connected to the network 405 in FIG. 4. In this embodiment, the computing device 400 may obtain travel directions from the server 410 that consist of travel actions, such as travel actions 710 as shown in FIGS. 7 and 8. The computing device 400 may also obtain a set of latitude numbers, longitude numbers, and vectors associated with the travel actions 710 for creating travel directions that are displayed on a map. The server 410 may obtain the latitude numbers, longitude numbers, and vectors using commercially available software such as is known in the art to determine travel directions based on a start point and an end point. For example, each of the travel actions 710 may contain one longitude number, one latitude number, and one or more vectors for rendering the travel action on a map.

The computing device 400 may use the set of latitude numbers, longitude numbers, and vectors to determine whether customization files match the received travel directions. For example, the computing device 400 may transmit the latitude and longitude numbers from the first and last travel action in each customization file along with the latitude and longitude numbers from each travel action in the received travel directions to a third server connected to network 405. The third server may compare the latitude and longitude numbers of the first travel action in a customization file with the latitude and longitude numbers in each travel action of the determined travel directions. If a match is found, the third server may compare the latitude and longitude numbers from the last travel action in the customization file with the latitude and longitude numbers from the succeeding travel actions in the travel directions. If another match is found, the third server may notify the computing device 400 of the match. The computing device 400 may then use the replacement travel action from the matching customization file. Alternatively, the computing device 400 may perform a second check on the matching customization file by following the flow chart diagram of FIG. 12A to ensure that the travel actions in the customization file match with the travel actions in the travel directions. In another alternative, the computing device 400 may compare the latitude and longitude numbers.

The computing device 400 may also obtain a map of the area associated with the travel directions from the map server. The computing device 400 may then create new travel directions by integrating the replacement travel action(s) from the matching customization file(s) into the travel directions, such as, e.g., shown in FIG. 15, or by integrating the travel actions onto the map from the map server using the set of latitude numbers, longitude numbers, and vectors. For example, the new travel directions may be an integrated map that only displays the travel actions that were not found to match with the stored travel actions from the customization file(s).

Alternatively, the server 410 may compare latitude and longitude numbers associated with stored travel actions that were stored in customization files with latitude and longitude numbers associated with the travel actions from the obtained travel directions, as described above. The server 410 may transmit any matching customization files with the obtained travel directions to the computing device 400. The computing device 400 may then use the matching customization files or compare the travel actions from the matching customization files with the travel actions from the travel directions to verify the match, as illustrated in FIG. 12A. The computing device 400 may then integrate the replacement travel action(s) from any matching and/or verified customization file(s) and output new travel directions to the user in the form of an integrated map and/or textual description as described previously.

Other embodiments are readily ascertainable by one of ordinary skill in the art. For example, a customization file may be made available to a class of users based on certain characteristics, such as having the same work place or other similar characteristics. Or a customization file may be made available to all users, such as, e.g., the situation where a replacement travel action is found to apply to all users. Moreover, the user may be allowed to modify the travel time according to the user's own local knowledge and experience or increase or decrease the travel time based on the time of day based on the user's experience. Further, the user may customize more than just one portion of a given set of travel directions, such as, e.g., selecting a second set of travel actions from FIGS. 11 and/or 15 for customization as described above. Even more, the server 410 may transmit determined travel directions to the computing device 400 and associated customization files, and the computing device 400 may integrate replacement travel actions from the customization files into the travel directions, such as, e.g., by using a script or an applet.

Other embodiments may include providing any type of travel directions, such as driving directions, walking directions, bus or train directions, or any type of directions which would be useful for customizing certain travel actions. Also, software and/or hardware for implementing the steps of the flowcharts from FIGS. 6–19 may be implemented on the computing device 400 and/or any combination with the server 410 or other computing devices or servers that are not shown, such as by an Internet service provider server that is connected between the computing device 400 and the network 405. Moreover, the blocks illustrated may be performed in different orders and are not required to be performed in the exact sequence illustrated. Furthermore, non-dependent acts may be implemented in parallel.

It will also be apparent to one of ordinary skill in the art that aspects of embodiments, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of certain aspects of the embodiments were described without reference to the specific software code—it being understood that one of ordinary skill in the art would be able to design software and control hardware to implement the aspects based on the description herein. Further, certain portions of embodiments may be implemented as "logic" that performs one or more functions. This logic may include hardware, such as an application specific integrated circuit or a field programmable gate array, software, or a combination of hardware and software.

Certain exemplary embodiments have been described and shown in the accompanying drawings. It is to be understood, however, that such embodiments are merely illustrative and not restrictive. The disclosure should not be limited to the specific constructions and arrangements explicitly disclosed because various other modifications will occur to those ordinarily skilled in the art.

What is claimed is:

1. A method for customizing travel actions in travel directions, comprising:
   providing a first set of travel directions to a user, the first set of travel directions comprising at least one travel action;
   receiving from the user at least one selected travel action and a replacement travel action associated with the first set of travel directions, wherein the replacement travel action replaces the at least one selected travel action in a second set of travel directions; and
   outputting the second set of travel directions.

2. The method of claim 1, further comprising storing the at least one selected travel action and the replacement travel action in a customization file.

3. The method of claim 1, further comprising receiving user modifications from the user.

4. The method of claim 3, further comprising storing a customization file, the customization file comprising the at least one selected travel action from the user, the user modifications, and the replacement travel action.

5. The method of claim 1, wherein the replacement travel action comprises at least one selected from a group consisting of: a summary of the at least one selected travel action, a short-cut, an empty space, an instruction to delete, and an alternate route.

6. A method for customizing travel actions in travel directions, comprising:
   obtaining travel directions based on a staff point and an end point;
   comparing travel actions from said travel directions with a customization file, said customization file including at least one selected travel action and a replacement travel action;
   determining that at least one travel action in said travel directions is the same as said at least one selected travel action; and
   integrating said replacement travel action into said travel directions.

7. The method of claim 6, further comprising implementing user modifications included in said customization file.

8. The method of claim 7, wherein said user modifications comprise replacing said at least one travel action with said replacement travel action only during a selected time of day.

9. The method of claim 7, wherein said user modifications comprise replacing said at least one travel action with said replacement travel action only during a predetermined period of time.

10. The method of claim 6, wherein comparing travel actions from said travel directions with a customization file and determining that at least one travel action in said travel directions are the same as said at least one selected travel action comprises:
    comparing travel actions from said travel directions with travel actions from a second set of previously determined travel directions;
    determining that at least one travel action in said travel directions are the same as at least one travel action from said second set of previously determined travel directions; and
    receiving said replacement travel action for said at least one travel action.

11. The method of claim 10, further comprising prompting said user to input said replacement travel action for said at least one travel action.

12. The method of claim 11, further comprising receiving any user modifications for said replacement travel action.

13. The method of claim 12, further comprising storing said at least one travel action, said replacement travel action, and said user modifications in a second customization file.

14. A computer program product, comprising:
    a computer usable medium having computer readable program code embodied therein to customize travel directions, the computer readable program code in the computer program product including:
      computer readable program code to provide a first set of travel directions to a user, the first set of travel directions comprising at least one travel action;

computer readable program code to receive from the user at least one selected travel action associated with the first set of travel directions;
computer readable program code to receive from the user a replacement travel action associated with the at least one selected travel action; and
computer readable program code to replace the at least one selected travel action with the replacement travel action in a second set of travel directions.

15. The computer program product of claim 14, wherein the computer readable program code in the computer usable medium further comprises:
computer readable program code to store the at least one selected travel action and the replacement travel action in a customization file;
computer readable program code to compare the customization file with a third set of travel directions; and
computer readable program code to integrate the replacement action with the third set of travel directions.

16. The computer program product of claim 15, wherein the computer readable program code to integrate the replacement action with the third set of travel directions further comprises:
computer readable program code to determine a map of the third set of travel directions containing only a depiction of the travel directions that did not match with stored travel actions in the customization file.

17. An apparatus for customizing travel directions, comprising:
means for obtaining a first set of travel directions, the first set of travel directions comprising at least one travel action;
means for comparing travel actions from the first set of travel directions with a customization file, the customization file comprising at least one selected travel action and a replacement travel action;
means for determining that the at least one travel action from the first set of travel directions corresponds with the at least one travel action from the customization file; and
means for outputting a second set of travel directions, wherein the replacement travel action replaces the at least one travel action from the first set of travel directions.

18. The apparatus of claim 17, wherein the apparatus further comprises a browser assistant.

19. The apparatus of claim 17, wherein the apparatus further comprises a server.

20. The apparatus of claim 17, further comprising:
means for comparing the first set of travel directions with previously saved travel directions;
means for receiving a second replacement travel action for a second at least one travel action from the first set of travel directions that corresponds with at least one travel action from the previously saved travel directions;
means for storing the second at least one travel action and the second replacement travel action in a second customization file; and
means for outputting a third set of travel directions, wherein the second replacement travel action replaces the second at least one travel action from the first set of travel directions.

21. The apparatus of claim 17, further comprising means for comparing the first set of travel directions with traffic information.

22. The apparatus of claim 21, further comprising means for determining at least one alternate travel action for the travel directions based on the traffic information.

23. An apparatus for customizing travel directions, comprising:
a communication unit adapted to obtain a first set of travel directions, the first set of travel directions comprising at least one travel action;
a selection unit adapted to receive a user's selection of a portion of the first set of travel directions;
a replacement travel action entry unit adapted to receive a replacement travel action associated with the portion of the first set of travel directions; and
a directions output unit adapted to output a second set of travel directions, wherein the replacement travel action replaces the portion of the first set of travel directions.

24. The apparatus of claim 23, further comprising a customization file storage unit adapted to store a customization file, the customization file including the replacement travel action and the portion of the first set of travel directions.

25. The apparatus of claim 24, further comprising a customization unit adapted to receive user modifications associated with the replacement travel action and the portion of the first set of travel directions, the customization file further including the user modifications.

26. The apparatus of claim 23, further comprising a directions comparison unit adapted to compare the first set of travel directions with previously stored customization files.

27. The apparatus of claim 26, wherein the directions comparison unit is adapted to determine that a second portion of the first set of travel directions correspond with travel actions stored in a previously stored customization file and the directions comparison unit is adapted to output a third set of travel directions, wherein a replacement travel action from the previously stored customization file replaces the second portion of the first set of travel directions.

28. The apparatus of claim 23, further comprising a traffic comparison unit adapted to determine if portions of the first set of travel directions have heavy traffic.

29. A system for customizing travel directions, comprising:
a server in communication with a network, the server adapted to obtain a first set of travel directions,
to transmit the first set of travel directions via the network to a computing device,
to receive from the computing device at least one selected travel action and a replacement travel action associated with the first set of travel directions, wherein the replacement travel action replaces the at least one selected travel action in a second set of travel directions, and
to transmit the second set of travel directions to the computing device and;
the computing device in communication with the network, the computing device adapted
to receive the first set of travel directions from the server,
to transmit the at least one selected travel action and the replacement travel action associated with the first set of travel directions to the server,
to receive the second set of travel directions from the server, and
to output the second set of travel directions.

30. The system of claim 29, wherein the server is further adapted to determine a first set of matching directions by comparing the first set of travel directions to a third set of travel directions that was previously obtained; and the computing device is further adapted to receive a second replacement travel action associated with the first set of matching directions.

31. The system of claim 30, wherein the server is further adapted to transmit the third set of travel directions to the computing device and the computing device is further adapted to output the third set of travel directions.

32. The system of claim 29, wherein the server is adapted to compare the first set of travel directions to a previously stored customization file.

33. The system of claim 32, wherein the server is adapted to create a third set of travel directions based on a match between a portion of the first set of travel directions and the previously stored customization file.

34. The system of claim 33, wherein the computing device is further adapted to receive the third set of travel directions from the server and to output the third set of travel directions to a user.

35. The system of claim 32, wherein the server is further adapted to determine that the previously stored customization file matches with the first set of travel directions, to determine that a second previously stored customization file matches with the first set of travel directions, to determine that the previously stored customization file and the second previously stored customization file contain travel actions that overlap, and to integrate a replacement travel action into the first set of travel directions based on a comparison of the previously stored customization file with the second previously stored customization file.

36. A method for customizing travel actions in travel directions, comprising:

providing a first set of travel directions to a computing device, the first set of travel directions comprising a plurality of travel actions;

receiving a selection of the plurality of travel actions and a replacement travel action from the computing device;

generating a second set of travel directions by replacing the selection of the plurality of travel actions in the first set of travel directions with the replacement travel action; and outputting the second set of travel directions to the computing device.

37. A computer program product, comprising:

a computer usable medium having computer readable program code embodied therein to customize travel directions, the computer readable program code in the computer program product including:

computer readable program code to provide a first set of travel directions to a computing device, the first set of travel directions comprising a plurality of travel actions;

computer readable program code to receive a selection of the plurality of travel actions and a replacement travel action from the computing device;

computer readable program code to generate a second set of travel directions by replacing the selection of the plurality of travel actions in the first set of travel directions with the replacement travel action; and computer readable program code to output the second set of travel directions to the computing device.

* * * * *

UNITED STATES PATENT AND TRADEMARK OFFICE
CERTIFICATE OF CORRECTION

PATENT NO.         : 7,239,959 B2                                      Page 1 of 1
APPLICATION NO. : 11/009163
DATED              : July 3, 2007
INVENTOR(S)        : Jens Eilstrup Rasmussen and Lars Eilstrup Rasmussen It is certified that error appears in the above-identified patent and that said Letters Patent is hereby corrected as shown below:

Column 16, line 18, please replace "staff" with --start--.

Signed and Sealed this

Twenty-eighth Day of August, 2007

JON W. DUDAS
*Director of the United States Patent and Trademark Office*